US009357507B2

(12) United States Patent
Nagaraja et al.

(10) Patent No.: US 9,357,507 B2
(45) Date of Patent: May 31, 2016

(54) CENTRALIZED MANAGEMENT FOR PILOT POLLUTION MITIGATION IN SMALL CELL NETWORKS

(71) Applicant: QUALCOMM Incorporated, San Diego, CA (US)

(72) Inventors: Sumeeth Nagaraja, San Diego, CA (US); Pooyan Amini, Salt Lake City, UT (US); Yeliz Tokgoz, San Diego, CA (US); Farhad Meshkati, San Diego, CA (US); Christophe Chevallier, San Diego, CA (US); Mehmet Yavuz, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 319 days.

(21) Appl. No.: 13/838,604

(22) Filed: Mar. 15, 2013

(65) Prior Publication Data
US 2014/0073343 A1 Mar. 13, 2014

Related U.S. Application Data

(60) Provisional application No. 61/700,815, filed on Sep. 13, 2012.

(51) Int. Cl.
*H04W 52/32* (2009.01)
*H04W 72/04* (2009.01)
*H04W 52/24* (2009.01)

(52) U.S. Cl.
CPC ............ *H04W 52/325* (2013.01); *H04W 72/04* (2013.01); *H04W 52/244* (2013.01)

(58) Field of Classification Search
CPC . H04W 24/02; H04W 28/048; H04W 52/244; H04W 72/082; H04W 72/0406; H04W 16/14; H04W 72/04; H04W 52/325
USPC .......................... 455/447, 448, 449, 500–507
See application file for complete search history.

(56) References Cited

U.S. PATENT DOCUMENTS 5,864,313 A * 1/1999 Speck et al. .................... 342/98
7,017,176 B1 * 3/2006 Lee et al. ....................... 725/111
(Continued)

FOREIGN PATENT DOCUMENTS

CN 101128011 A 2/2008
WO 2009099810 8/2009

OTHER PUBLICATIONS

International Search Report and Written Opinion—PCT/US2013/059820—ISA/EPO—Dec. 3, 2013.
(Continued)

*Primary Examiner* — Magdi Elhag
(74) *Attorney, Agent, or Firm* — Tyler J. Overall

(57) ABSTRACT

A small cell (e.g., femtocell) in a wireless communication may determine a set of wireless signal measurements for a plurality of small cells causing pilot cell pollution within a coverage area. The small cell may determine an adjustment of a transmission parameter of the small cells for reducing the pilot cell pollution, and transmit the adjustment to the small cells. The adjustment may include, for example, minimizing an area of overlap between at least two small cells having signal power difference below a threshold, maximizing a signal to interference and noise ratio at a location associated with at least two small cells, minimizing an area associated with at least two pilot signals within a threshold signal level, distributing traffic load to at least two of the small cells based on the set of measurements, or by minimizing the number of small cells covering a path.

26 Claims, 22 Drawing Sheets

(56) References Cited

U.S. PATENT DOCUMENTS

| | | | |
|---|---|---|---|
| 8,054,895 B2* | 11/2011 | Gerlach | H04B 7/022 |
| | | | 375/259 |
| 2007/0238414 A1* | 10/2007 | Cleveland et al. | 455/63.1 |
| 2008/0037497 A1* | 2/2008 | Ludovico et al. | 370/341 |
| 2008/0285534 A1* | 11/2008 | Dent | 370/342 |
| 2009/0137241 A1* | 5/2009 | Yavuz | H04W 74/04 |
| | | | 455/423 |
| 2009/0323530 A1 | 12/2009 | Trigui et al. | |
| 2010/0020771 A1 | 1/2010 | Ji et al. | |
| 2010/0325267 A1 | 12/2010 | Mishra et al. | |
| 2011/0217974 A1* | 9/2011 | Naka | H04B 1/707 |
| | | | 455/423 |
| 2013/0028107 A1 | 1/2013 | Ho et al. | |
| 2013/0210491 A1* | 8/2013 | Eriksson et al. | 455/562.1 |

OTHER PUBLICATIONS

Michael Lin et al: "Dynamic Interference Management in Femtocells," Computer Communications and Networks (ICCCN), 2012 21st International Conference on, IEEE, Jul. 30, 2012, pp. 1-9, XP032229638, DOI: 10.1109/ICCCN.2012.6289194 ISBN: 978-1-4673-1543-2.

Niemela J et al: "Mitigation of pilot pollution through base station antenna configuration in WCDMA", 2004 IEEE 60th Vehicular Technology Conference, VTC2004-Fall (IEEE Cat. N0.04CH37575) IEEE Piscataway, NJ, USA, IEEE, vol. 6, Sep. 26, 2004, pp. 4270-4274, XP010790226, D0I:10.1109/VETECF.2004.1404884, ISBN: 978-0-7803-8521.

* cited by examiner

CENTRALIZED MANAGEMENT FOR PILOT POLLUTION MITIGATION IN SMALL CELL NETWORKS

CROSS-REFERENCE TO RELATED APPLICATION

This application for claims priority under 35 U.S.C. §119 (e) to provisional application Ser. No. 61/700,815, filed Sep. 13, 2012, which application is assigned to the assignee hereof and expressly incorporated by reference herein in its entirety.

FIELD

The present disclosure relates to cellular wireless communication systems, and more particularly to pilot pollution mitigation in such systems.

BACKGROUND

Wireless communication networks are widely deployed to provide various communication content such as voice, video, packet data, messaging, broadcast, etc. These wireless networks may be multiple-access networks capable of supporting multiple users by sharing the available network resources. Examples of such multiple-access networks include Code Division Multiple Access (CDMA) networks, Time Division Multiple Access (TDMA) networks, Frequency Division Multiple Access (FDMA) networks, Orthogonal FDMA (OFDMA) networks, and Single-Carrier FDMA (SC-FDMA) networks.

A wireless communication network may include a number of base stations that can support communication for a number of mobile entities, such as, for example, user equipments (UEs). A UE may communicate with a base station via the downlink (DL) and uplink (UL). The DL (or forward link) refers to the communication link from the base station to the UE, and the UL (or reverse link) refers to the communication link from the UE to the base station.

The 3rd Generation Partnership Project (3GPP) Long Term Evolution (LTE) represents a major advance in cellular technology as an evolution of Global System for Mobile communications (GSM) and Universal Mobile Telecommunications System (UMTS). The LTE physical layer (PHY) provides a highly efficient way to convey both data and control information between base stations, such as an evolved Node Bs (eNBs), and mobile entities, such as UEs.

In recent years, users have started to replace fixed line broadband communications with mobile broadband communications and have increasingly demanded great voice quality, reliable service, and low prices, especially at their home or office locations. In order to provide indoor services, network operators may deploy different solutions. For networks with moderate traffic, operators may rely on macro cellular base stations to transmit the signal into buildings. However, in areas where building penetration loss is high, it may be difficult to maintain acceptable signal quality, and thus other solutions are desired. New solutions are frequently desired to make the best of the limited radio resources such as space and spectrum. Some of these solutions include intelligent repeaters, remote radio heads, and small-coverage base stations (e.g., picocells and femtocells).

The Femto Forum, a non-profit membership organization focused on standardization and promotion of femtocell solutions, defines femto access points (FAPs), also referred to as femtocell units, to be low-powered wireless access points that operate in licensed spectrum and are controlled by the network operator, can be connected with existing handsets, and use a residential digital subscriber line (DSL) or cable connection for backhaul. In various standards or contexts, a FAP may be referred to as a home node B (HNB), home e-node B (HeNB), access point base station, or other terminology. As used herein, a "small cell" refers to a femtocell, FAP, HNB, HeNB or other access point having a transmit power substantially lower than macro cells/eNBs of an associated wireless communication network. For example, a small cell transmit power may be less than 1% or less than 5% that of a macro cell. For further example, a macro base station may transmit at a maximum power of about 40 W, while a small cell may transmit at a maximum power of about 1 W.

Heterogeneous networks including macrocell and small cell base stations pose various challenges and opportunities for managing interference and reducing pilot signal pollution from competing small cells. It is desirable to develop new technologies to meet these challenges and take advantage of new opportunities.

SUMMARY

Methods, apparatus and systems for pilot pollution mitigation in cellular wireless communication networks are described in detail in the detailed description, and certain aspects are summarized below. This summary and the following detailed description should be interpreted as complementary parts of an integrated disclosure, which parts may include redundant subject matter and/or supplemental subject matter. An omission in either section does not indicate priority or relative importance of any element described in the integrated application. Differences between the sections may include supplemental disclosures of alternative embodiments, additional details, or alternative descriptions of identical embodiments using different terminology, as should be apparent from the respective disclosures.

In an aspect, a method operable by a small cell of a wireless communication network may include determining a set of wireless signal measurements for a plurality of small cells. The method may include detecting pilot cell pollution within a coverage area of the plurality of small cells based on the measurements. The method may include determining an adjustment of at least one transmission parameter of at least one of the plurality of small cells for reducing the pilot cell pollution, and transmitting the adjustment to the at least one of the plurality of small cells.

In an aspect, determining the adjustment may include minimizing an area of overlap between at least two small cells having signal power difference below a threshold based on the set of measurements. In the alternative, or in addition, determining the adjustment may include maximizing a signal to interference and noise ratio at a location associated with at least two small cells based on the set of measurements. In another non-exclusive alternative, determining the adjustment may include minimizing an area associated with at least two pilot signals within a threshold signal level based on the set of measurements. In yet other non-exclusive alternatives, determining the adjustment comprises distributing traffic load to at least two of the small cells, or minimizing the number of small cells covering a path (e.g., roadway) based on the set of measurements. Determining the adjustment may be performed by a network entity such as a femtocell.

In further more detailed aspects, determining the adjustment may be based on at least one of a numerical procedure or iterative procedure. Determining the adjustment may also include performing the determining based on at least one of a signal quality constraint or transmit power level constraint.

Determining the adjustment comprises determining a resource comprising power, frequency, or time.

In other more detailed aspects, determining the set of measurements may include at least one of determining measurements of the plurality of small cells at a femtocell, receiving measurement report messages from a mobile station, determining measurements from idle user registration, determining measurements from active user handover, or determining measurements from handover history information. The set of measurements may include radio frequency information including PL, RSSI, or Ecp/Io.

In related aspects, a wireless communication apparatus may be provided for performing any of the methods and aspects of the methods summarized above. An apparatus may include, for example, a processor coupled to a memory, wherein the memory holds instructions for execution by the processor to cause the apparatus to perform operations as described above. Certain aspects of such apparatus (e.g., hardware aspects) may be exemplified by equipment such a small cell, for example a femtocell or Home Node B. Similarly, an article of manufacture may be provided, including a computer-readable storage medium holding encoded instructions, which when executed by a processor, cause a small cell to perform the methods and aspects of the methods as summarized above.

DETAILED DESCRIPTION

Techniques for interference management in a wireless communication system are described herein. The techniques may be used for various wireless communication networks such as wireless wide area networks (WWANs) and wireless local area networks (WLANs). The terms "network" and "system" are often used interchangeably. The WWANs may be CDMA, TDMA, FDMA, OFDMA, SC-FDMA and/or other networks. A CDMA network may implement a radio technology such as Universal Terrestrial Radio Access (UTRA), cdma2000, etc. UTRA includes Wideband CDMA (WCDMA) and other variants of CDMA. cdma2000 covers IS-2000, IS-95 and IS-856 standards. A TDMA network may implement a radio technology such as Global System for Mobile Communications (GSM). An OFDMA network may implement a radio technology such as Evolved UTRA (E-UTRA), Ultra Mobile Broadband (UMB), IEEE 802.16 (WiMAX), IEEE 802.20, Flash-OFDM, etc. UTRA and E-UTRA are part of Universal Mobile Telecommunication System (UMTS). 3GPP Long Term Evolution (LTE) and LTE-Advanced (LTE-A) are new releases of UMTS that use E-UTRA, which employs OFDMA on the downlink (DL) and SC-FDMA on the uplink (UL). UTRA, E-UTRA, UMTS, LTE, LTE-A and GSM are described in documents from an organization named "3rd Generation Partnership Project" (3GPP). cdma2000 and UMB are described in documents from an organization named "3rd Generation Partnership Project 2" (3GPP2). A WLAN may implement a radio technology such as IEEE 802.11 (WiFi), Hiperlan, etc.

The techniques described herein may be used for the wireless networks and radio technologies mentioned above as well as other wireless networks and radio technologies. For clarity, certain aspects of the techniques are explained in the exemplary context of 3GPP networks, and more particularly in the context of the interference management for such networks. The word "exemplary" is used herein to mean "serving as an example, instance, or illustration." Any embodiment described herein as "exemplary" is not necessarily to be construed as preferred or advantageous over other embodiments.

Figure 1:
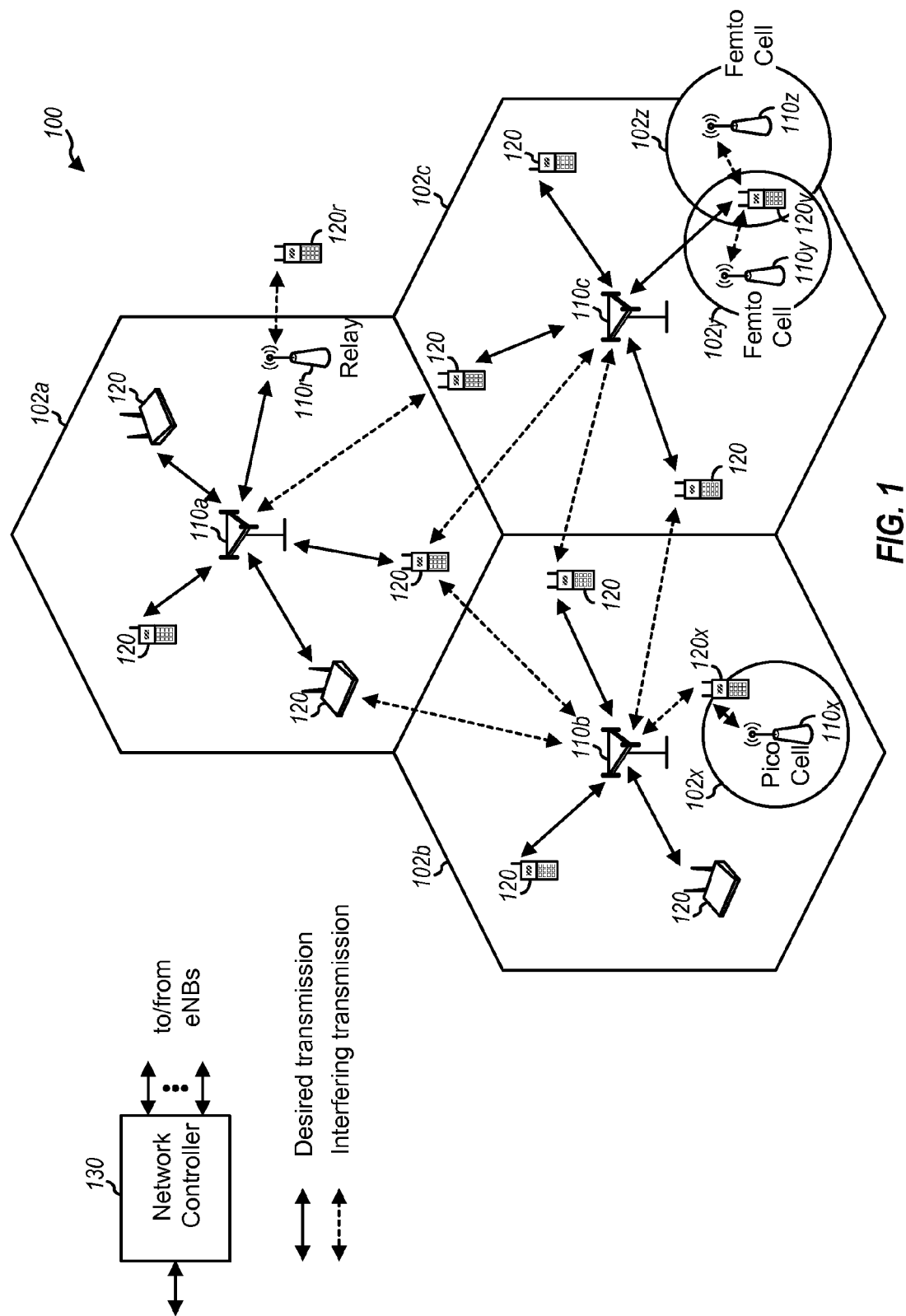
FIG. 1 is a block diagram conceptually illustrating an example of a telecommunications system.

FIG. 1 shows a wireless communication network 100, which may be an LTE network or some other wireless network (e.g., a 3G network or the like). Wireless network 100 may include a number of evolved Node Bs (eNBs) 110a-c and other network entities. An eNB may be an entity that communicates with mobile entities (e.g., user equipment (UE)) and may also be referred to as a base station, a Node B, an access point, or other terminology. Although the eNB typically has more functionalities than a base station, the terms "eNB" and "base station" are used interchangeably herein. Each eNB 110a-c may provide communication coverage for a particular geographic area and may support communication for mobile entities (e.g., UEs) located within the coverage area. To improve network capacity, the overall coverage area of an eNB may be partitioned into multiple (e.g., three) smaller areas. Each smaller area may be served by a respective eNB subsystem. In 3GPP, the term "cell" can refer to the smallest coverage area of an eNB and/or an eNB subsystem serving this coverage area, depending on the context in which the term is used.

An eNB may provide communication coverage for a macro cell, a picocell, a femtocell, and/or other types of cell. A macro cell may cover a relatively large geographic area (e.g., several kilometers in radius) and may allow unrestricted access by UEs with service subscription. A picocell may cover a relatively small geographic area and may allow unrestricted access by UEs with service subscription. A femtocell may cover a relatively small geographic area (e.g., a home) and may allow restricted access by UEs having association with the femtocell (e.g., UEs in a Closed Subscriber Group (CSG), or closed access). In the example shown in FIG. 1, eNBs 110a, 110b, and 110c may be macro eNBs for macro cell groups 102a, 102b, and 102c, respectively. Each of the cell groups 102a, 102b, and 102c may include a plurality (e.g., three) of cells or sectors. An eNB 110x may be a pico eNB for a picocell 102x. An eNB 110y may be a femto eNB or femto access point (FAP) for a femtocell 102y, which may have an overlapping or non-overlapping coverage area with an adjacent femtocell 102z of femto eNB 110z.

Wireless network 100 may also include relays (not shown in FIG. 1). A relay may be an entity that can receive a transmission of data from an upstream station (e.g., an eNB or a UE) and send a transmission of the data to a downstream station (e.g., a UE or an eNB). A relay may also be a UE that can relay transmissions for other UEs.

A network controller 130 may couple to a set of eNBs and may provide coordination and control for these eNBs. Network controller 130 may include a single network entity or a collection of network entities. Network controller 130 may communicate with the eNBs via a backhaul. The eNBs may also communicate with one another, e.g., directly or indirectly via a wireless or wireline backhaul.

UEs 120 may be dispersed throughout wireless network 100, and each UE may be stationary or mobile. A UE may also be referred to as a mobile station, a terminal, an access terminal, a subscriber unit, a station, etc. A UE may be a cellular phone, a personal digital assistant (PDA), a wireless modem, a wireless communication device, a handheld device, a laptop computer, a cordless phone, a wireless local loop (WLL) station, a smart phone, a netbook, a smartbook, etc. A UE may be able to communicate with eNBs, relays, etc. A UE may also be able to communicate peer-to-peer (P2P) with other UEs.

Wireless network 100 may support operation on a single carrier or multiple carriers for each of the DL and UL. A carrier may refer to a range of frequencies used for communication and may be associated with certain characteristics. Operation on multiple carriers may also be referred to as multi-carrier operation or carrier aggregation. A UE may operate on one or more carriers for the DL (or DL carriers) and one or more carriers for the UL (or UL carriers) for communication with an eNB. The eNB may send data and control information on one or more DL carriers to the UE. The UE may send data and control information on one or more UL carriers to the eNB. In one design, the DL carriers may be paired with the UL carriers. In this design, control information to support data transmission on a given DL carrier may be sent on that DL carrier and an associated UL carrier. Similarly, control information to support data transmission on a given UL carrier may be sent on that UL carrier and an associated DL carrier. In another design, cross-carrier control may be supported. In this design, control information to support data transmission on a given DL carrier may be sent on another DL carrier (e.g., a base carrier) instead of the given DL carrier.

Wireless network 100 may support carrier extension for a given carrier. For carrier extension, different system bandwidths may be supported for different UEs on a carrier. For example, the wireless network may support (i) a first system bandwidth on a DL carrier for first UEs (e.g., UEs supporting LTE Release 8 or 9 or some other release) and (ii) a second system bandwidth on the DL carrier for second UEs (e.g., UEs supporting a later LTE release). The second system bandwidth may completely or partially overlap the first system bandwidth. For example, the second system bandwidth may include the first system bandwidth and additional bandwidth at one or both ends of the first system bandwidth. The additional system bandwidth may be used to send data and possibly control information to the second UEs.

Wireless network 100 may support data transmission via single-input single-output (SISO), single-input multiple-output (SIMO), multiple-input single-output (MISO), and/or multiple-input multiple-output (MIMO). For MIMO, a transmitter (e.g., an eNB) may transmit data from multiple transmit antennas to multiple receive antennas at a receiver (e.g., a UE). MIMO may be used to improve reliability (e.g., by transmitting the same data from different antennas) and/or to improve throughput (e.g., by transmitting different data from different antennas).

Wireless network 100 may support single-user (SU) MIMO, multi-user (MU) MIMO, Coordinated Multi-Point (CoMP), etc. For SU-MIMO, a cell may transmit multiple data streams to a single UE on a given time-frequency resource with or without precoding. For MU-MIMO, a cell may transmit multiple data streams to multiple UEs (e.g., one data stream to each UE) on the same time-frequency resource with or without precoding. CoMP may include cooperative transmission and/or joint processing. For cooperative transmission, multiple cells may transmit one or more data streams to a single UE on a given time-frequency resource such that the data transmission is steered toward the intended UE and/or away from one or more interfered UEs. For joint processing, multiple cells may transmit multiple data streams to multiple UEs (e.g., one data stream to each UE) on the same time-frequency resource with or without precoding.

Wireless network 100 may support hybrid automatic retransmission (HARQ) in order to improve reliability of data transmission. For HARQ, a transmitter (e.g., an eNB) may send a transmission of a data packet (or transport block) and may send one or more additional transmissions, if needed, until the packet is decoded correctly by a receiver (e.g., a UE), or the maximum number of transmissions has been sent, or some other termination condition is encountered. The transmitter may thus send a variable number of transmissions of the packet.

Wireless network 100 may support synchronous or asynchronous operation. For synchronous operation, the eNBs may have similar frame timing, and transmissions from different eNBs may be approximately aligned in time. For asynchronous operation, the eNBs may have different frame timing, and transmissions from different eNBs may not be aligned in time.

Wireless network 100 may utilize frequency division duplex (FDD) or time division duplex (TDD). For FDD, the DL and UL may be allocated separate frequency channels, and DL transmissions and UL transmissions may be sent concurrently on the two frequency channels. For TDD, the DL and UL may share the same frequency channel, and DL and UL transmissions may be sent on the same frequency channel in different time periods.

Figure 2:
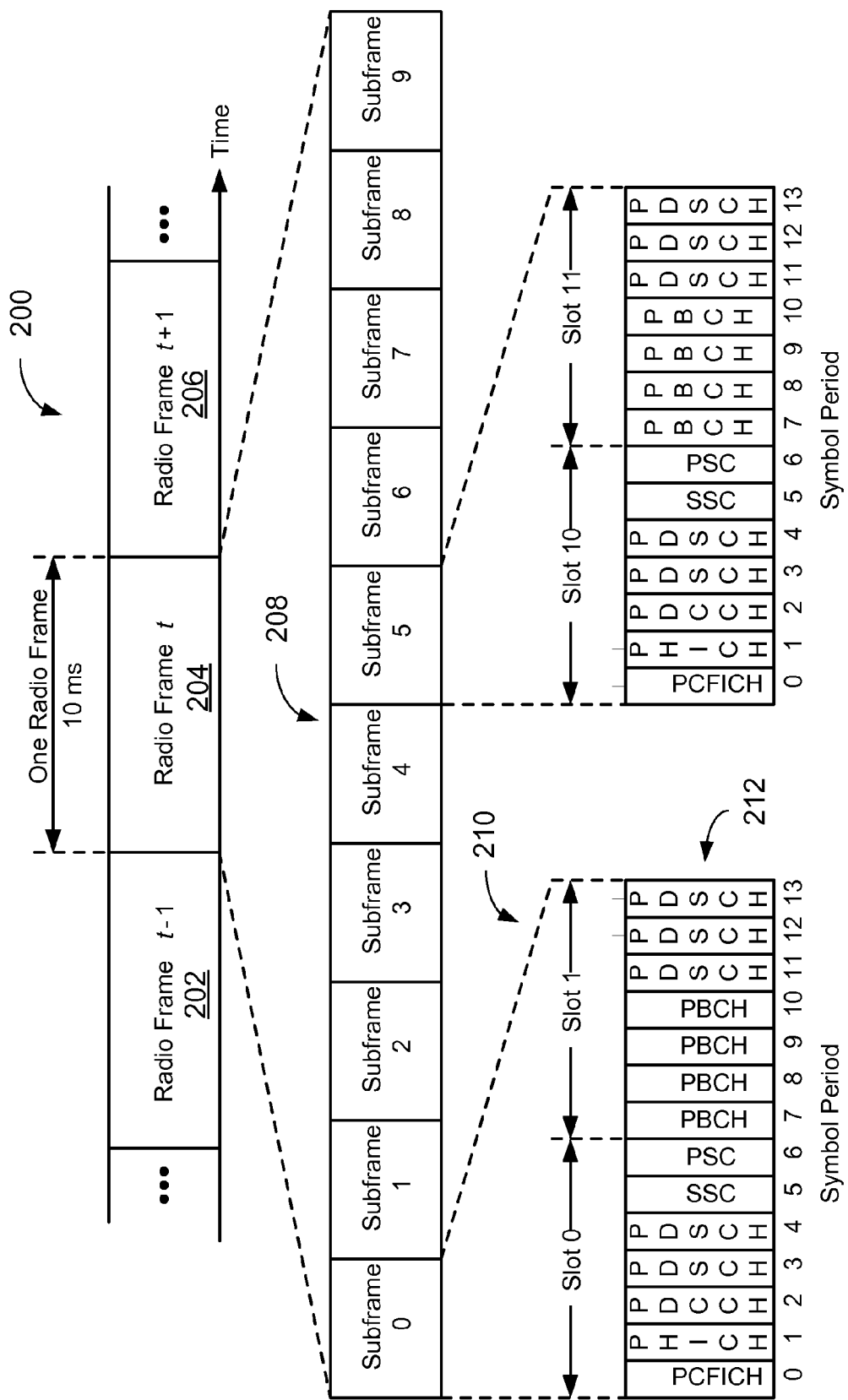
FIG. 2 is a block diagram conceptually illustrating an example of a down link frame structure in a telecommunications system.
Figure 6:
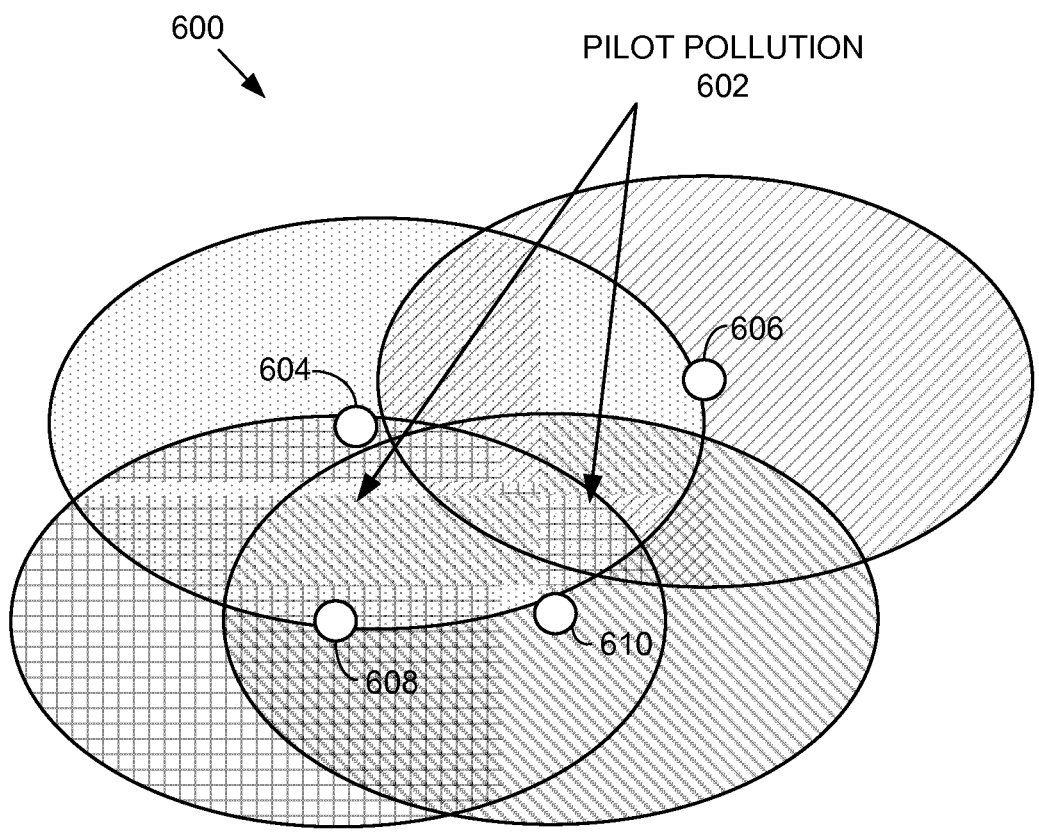
FIG. 6 illustrates pilot pollution in a small cell network environment.

FIG. 2 shows a down link frame structure 200 used in LTE. The transmission timeline for the downlink may be partitioned into units of radio frames 202, 204, 206. Each radio frame may have a predetermined duration (e.g., 10 milliseconds (ms)) and may be partitioned into ten subframes 208 with indices of 0 through 9. Each subframe may include two slots 210. Each radio frame may thus include twenty slots with indices of 0 through 19. Each slot may include L symbol periods 212, e.g., 7 symbol periods for a normal cyclic prefix (CP), as shown in FIG. 2, or 6 symbol periods for an extended cyclic prefix. The normal CP and extended CP may be referred to herein as different CP types. The 2L symbol periods in each subframe may be assigned indices of 0 through 2L−1. The available time frequency resources may be partitioned into resource blocks. Each resource block may cover N subcarriers (e.g., 12 subcarriers) in one slot.

In LTE, an eNB may send a primary synchronization signal (PSS) and a secondary synchronization signal (SSS) for each cell in the eNB. The primary and secondary synchronization signals may be sent in symbol periods 6 and 5, respectively, in each of subframes 0 and 5 of each radio frame with the normal cyclic prefix, as shown in FIG. 2. The synchronization signals may be used by UEs for cell detection and acquisition. The eNB may send a Physical Broadcast Channel (PBCH) in symbol periods 0 to 3 in slot 1 of subframe 0. The PBCH may carry certain system information.

The eNB may send a Physical Control Format Indicator Channel (PCFICH) in only a portion of the first symbol period of each subframe, although depicted in the entire first symbol period in FIG. 2. The PCFICH may convey the number of symbol periods (M) used for control channels, where M may be equal to 1, 2 or 3 and may change from subframe to subframe. M may also be equal to 4 for a small system bandwidth, e.g., with less than 10 resource blocks. In the example shown in FIG. 2, M=3. The eNB may send a Physical HARQ Indicator Channel (PHICH) and a Physical Downlink Control Channel (PDCCH) in the first M symbol periods of each subframe (M=3 in FIG. 2). The PHICH may carry information to support hybrid automatic retransmission (HARQ). The PDCCH may carry information on resource allocation for UEs and control information for downlink channels. Although not shown in the first symbol period in FIG. 2, it is understood that the PDCCH and PHICH are also included in the first symbol period. Similarly, the PHICH and PDCCH are also both in the second and third symbol periods, although not shown that way in FIG. 2. The eNB may send a Physical Downlink Shared Channel (PDSCH) in the remaining symbol periods of each subframe. The PDSCH may carry data for UEs scheduled for data transmission on the downlink. The various signals and channels in LTE are described in 3GPP TS 36.211, entitled "Evolved Universal Terrestrial Radio Access (E-UTRA); Physical Channels and Modulation," which is publicly available.

The eNB may send the PSS, SSS and PBCH in the center 1.08 MHz of the system bandwidth used by the eNB. The eNB may send the PCFICH and PHICH across the entire system bandwidth in each symbol period in which these channels are sent. The eNB may send the PDCCH to groups of UEs in certain portions of the system bandwidth. The eNB may send the PDSCH to specific UEs in specific portions of the system bandwidth. The eNB may send the PSS, SSS, PBCH, PCFICH and PHICH in a broadcast manner to all UEs, may send the PDCCH in a unicast manner to specific UEs, and may also send the PDSCH in a unicast manner to specific UEs.

A UE may be within the coverage of multiple eNBs. One of these eNBs may be selected to serve the UE. The serving eNB may be selected based on various criteria such as received power, path loss, signal-to-noise ratio (SNR), or similar criteria.

Figure 3:
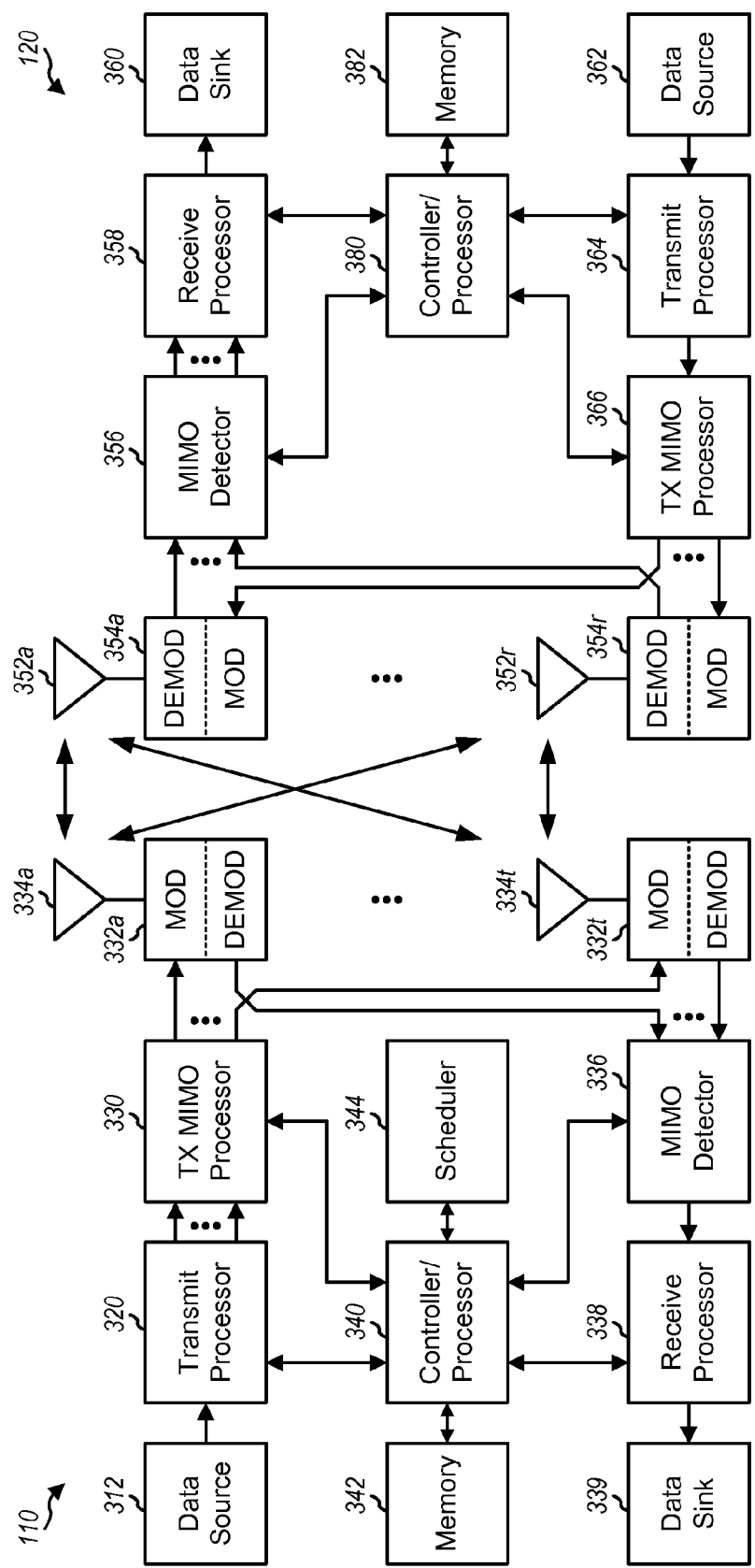
FIG. 3 is a block diagram conceptually illustrating a design of a base station/eNB and a UE.

FIG. 3 shows a block diagram of a design of a base station/eNB 110 and a UE 120, which may be one of the base stations/eNBs and one of the UEs in FIG. 1. For a restricted association scenario, the base station 110 may be the macro eNB 110c in FIG. 1, and the UE 120 may be the UE 120y. The base station 110 may also be a base station of some other type such as an access point including a femtocell, a picocell, etc. The base station 110 may be equipped with antennas 334a through 334t, and the UE 120 may be equipped with antennas 352a through 352r.

At the base station 110, a transmit processor 320 may receive data from a data source 312 and control information from a controller/processor 340. The control information may be for the PBCH, PCFICH, PHICH, PDCCH, or other channel. The data may be for the PDSCH, etc. The processor 320 may process (e.g., encode and symbol map) the data and control information to obtain data symbols and control symbols, respectively. The processor 320 may also generate reference symbols, e.g., for the PSS, SSS, and cell-specific reference signal. A transmit (TX) multiple-input multiple-output (MIMO) processor 330 may perform spatial processing (e.g., precoding) on the data symbols, the control symbols, and/or the reference symbols, if applicable, and may provide output symbol streams to the modulators (MODs) 332a through 332t. Each modulator 332 may process a respective output symbol stream (e.g., for OFDM or other encoding method) to obtain an output sample stream. Each modulator 332 may further process (e.g., convert to analog, amplify, filter, and upconvert) the output sample stream to obtain a downlink signal. Downlink signals from modulators 332a through 332t may be transmitted via the antennas 334a through 334t, respectively.

At the UE 120, the antennas 352a through 352r may receive the downlink signals from the base station 110 and may provide received signals to the demodulators (DEMODs) 354a through 354r, respectively. Each demodulator 354 may condition (e.g., filter, amplify, downconvert, and digitize) a respective received signal to obtain input samples. Each demodulator 354 may further process the input samples (e.g., for OFDM, etc.) to obtain received symbols. A MIMO detector 356 may obtain received symbols from all the demodulators 354a through 354r, perform MIMO detection on the received symbols if applicable, and provide detected symbols. A receive processor 358 may process (e.g., demodulate, deinterleave, and decode) the detected symbols, provide decoded data for the UE 120 to a data sink 360, and provide decoded control information to a controller/processor 380.

On the uplink, at the UE 120, a transmit processor 364 may receive and process data (e.g., for the PUSCH) from a data source 362 and control information (e.g., for the PUCCH) from the controller/processor 380. The processor 364 may also generate reference symbols for a reference signal. The symbols from the transmit processor 364 may be precoded by a TX MIMO processor 366 if applicable, further processed by the modulators 354a through 354r (e.g., for SC-FDM, etc.), and transmitted to the base station 110. At the base station 110, the uplink signals from the UE 120 may be received by the antennas 334, processed by the demodulators 332, detected by a MIMO detector 336 if applicable, and further processed by a receive processor 338 to obtain decoded data and control information sent by the UE 120. The processor 338 may provide the decoded data to a data sink 339 and the decoded control information to the controller/processor 340.

The controllers/processors 340 and 380 may direct the operation at the base station 110 and the UE 120, respectively. The processor 340 and/or other processors and modules at the base station 110 may perform or direct the execution of various processes for the techniques described herein. The processor 380 and/or other processors and modules at the UE 120 may also perform or direct the execution of the functional blocks illustrated in FIGS. 11-15 and/or 21, and/or other operation for performing the techniques described herein. The memories 342 and 382 may store data and program codes for the base station 110 and the UE 120, respectively. A scheduler 344 may schedule UEs for data transmission on the downlink and/or uplink.

In one configuration, for example, the UE 120 for wireless communication may include means for determining a location uncovered by a wireless network, means for generating a coverage hole detected message if one or more conditions associated with the uncovered location are satisfied, and means for determining a time to transmit the coverage hole detected message to a covered wireless network. The means for determining the coverage hole may be configured so that the coverage hole can be detected without having or losing a prior connection to the wireless network in which the coverage hole exists. In one aspect, the aforementioned means may include the processor(s), the controller/processor 380, the memory 382, the receive processor 358, the MIMO detector 356, the demodulators 354a, and the antennas 352a configured to perform the functions recited by the aforementioned means. In another aspect, the aforementioned means may be a module or any apparatus configured to perform the functions recited by the aforementioned means.

Figure 4:
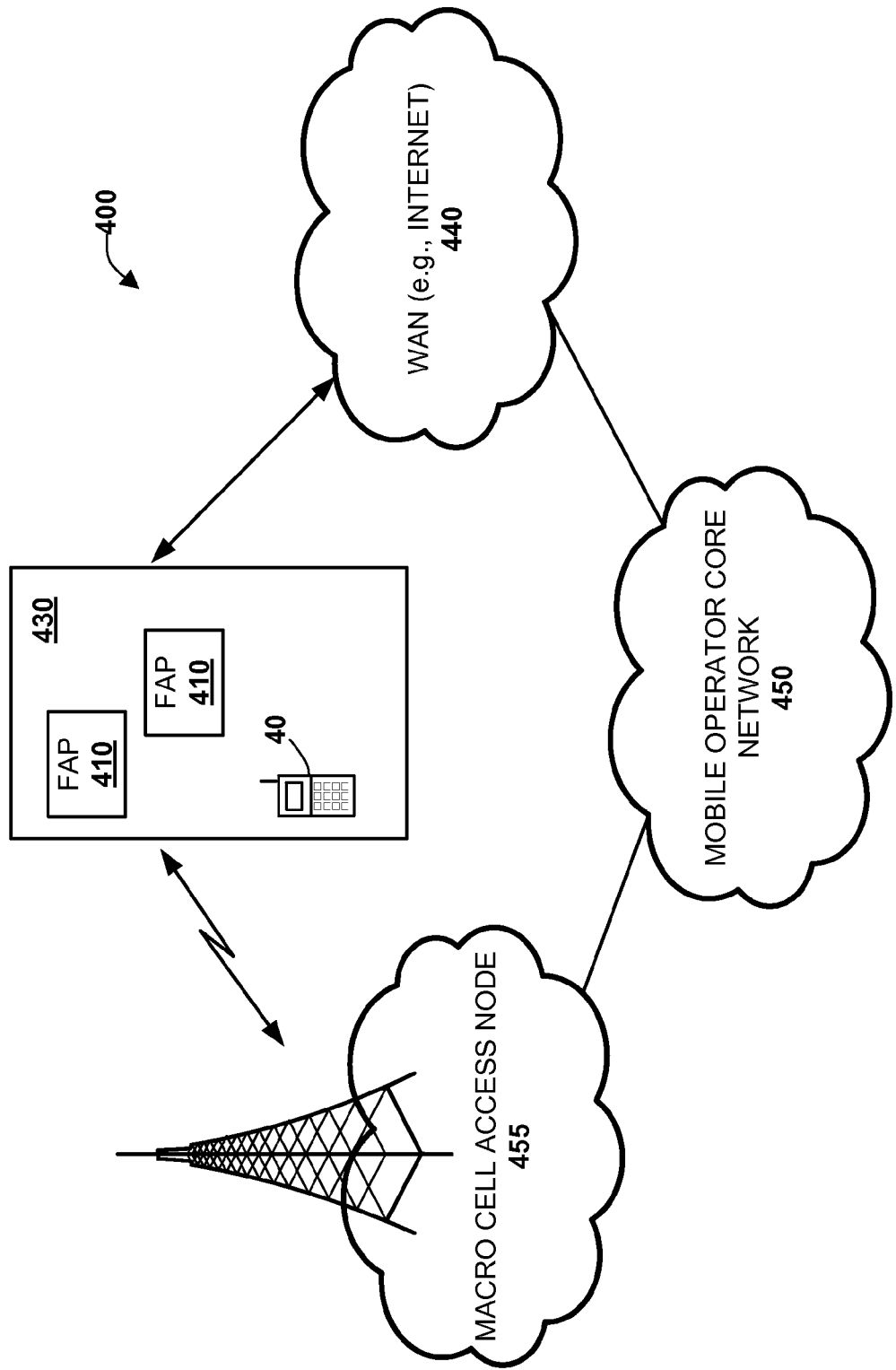
FIG. 4 is a block diagram illustrating another example communication system.

FIG. 4 is an illustration of a planned or semi-planned (e.g, partially ad-hoc) wireless communication environment 400, in accordance with various aspects. Communication environment 400 includes multiple access point base stations, including FAPs 410, each of which are installed in corresponding small scale network environments. Examples of small scale network environments can include user residences, places of business, indoor/outdoor facilities 430, and so forth. The FAPs 410 can be configured to serve associated UEs 40 (e.g., included in a CSG associated with FAPs 410), or optionally alien or visitor UEs 40 (e.g., UEs that are not configured for the CSG of the FAP 410). Each FAP 410 is further coupled to a wide area network (WAN) (e.g., the Internet 440) and a mobile operator core network 450 via a DSL router, a cable modem, a broadband over power line connection, a satellite Internet connection, or the like.

To implement wireless services via FAPs 410, an owner of the FAPs 410 subscribes to mobile service offered through the mobile operator core network 450. Also, the UE 40 can be capable to operate in a macro cellular environment and/or in a residential small scale network environment, utilizing various techniques described herein. Thus, at least in some disclosed aspects, FAP 410 can be backward compatible with any suitable existing UE 40. Furthermore, in addition to the macro cell mobile network 455, UE 40 is served by a predetermined number of FAPs 410, specifically FAPs 410 that reside within a corresponding user residence(s), place(s) of business, or indoor/outdoor facilities 430, and cannot be in a soft handover state with the macro cell mobile network 455 of the mobile operator core network 450. It should be appreciated that although aspects described herein employ 3GPP terminology, it is to be understood that the aspects can also be applied to various technologies, including 3GPP technology (e.g., Release (Rel) 9, Rel5, Rel6, Rel7), 3GPP2 technology (1×RTT, 1×EV-DO Rel0, RevA, RevB), and other known and related technologies.

Figure 5:
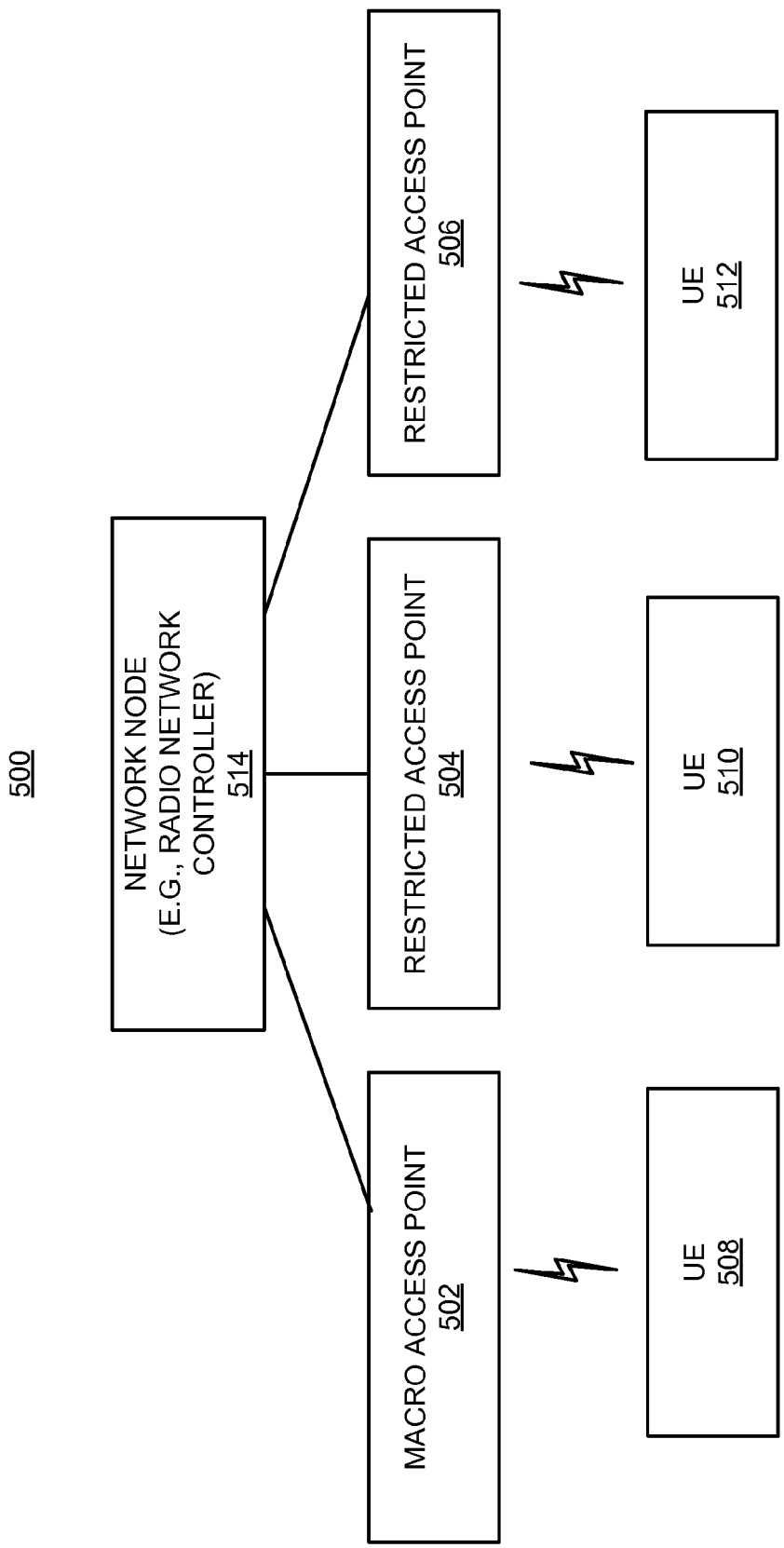
FIG. 5 is a simplified block diagram of several sample aspects of a communication system.

FIG. 5 illustrates sample aspects of a communication system 500 where distributed nodes (e.g., access points 502, 504, and 506) provide wireless connectivity for other nodes (e.g., UEs 508, 510, and 512) that may be installed in or that may roam throughout an associated geographical area. In some aspects, the access points 502, 504, and 506 may communicate with one or more network nodes (e.g., a centralized network controller such as network node 514) to facilitate WAN connectivity.

An access point, such as access point 504, may be restricted whereby only certain mobile entities (e.g., UE 510) are allowed to access the access point, or the access point may be restricted in some other manner. In such a case, a restricted access point and/or its associated mobile entities (e.g., UE 510) may interfere with other nodes in the system 500 such as, for example, an unrestricted access point (e.g., macro access point 502), its associated mobile entities (e.g., UE 508), another restricted access point (e.g., access point 506), or its associated mobile entities (e.g., UE 512). For example, the closest access point to a given UE may not be the serving access point for the given UE.

In some cases, the UE 510 may generate measurement reports (e.g., on repeated basis). In some aspects, such a measurement report may indicate which access points the UE 510 is receiving signals from, a received signal strength indication associated with the signals from each access point (e.g., Ec/Io), the PL to each of the access points, or some other suitable type of information. In some cases a measurement report may include information relating to any load indications the UE 510 received via a DL. The network node 514 may then use the information from one or more measurement reports to determine whether the access point 504 and/or the UE 510 are relatively close to another node (e.g., another access point or UE).

In some cases, the UE 510 may generate information that is indicative of the signal to noise ratio (e.g., signal and interference to noise ratio, SINR) on a DL. Such information may comprise, for example a channel quality indication ("CQI"), a data rate control ("DRC") indication, or some other suitable information. In some cases, this information may be sent to the access point 504 and the access point 504 may forward this information to the network node 514 for use in interference management operations. In some aspects, the network node 514 may use such information to determine whether there is interference on a DL or to determine whether interference in the DL is increasing or decreasing.

Pilot Pollution Mitigation

As discussed above, an eNB may provide communication coverage for a macro cell, a picocell, a femtocell, and/or other types of cell. Capacity offload gains of a femtocell network are maximized when femtocells are deployed on a dedicated carrier, and thus, there is no interference from a macro network on the same channel as the deployed femtocells. However, because bandwidth is such a scarce resource, bandwidth needs to be allocated and managed with great care and efficiency. Accordingly, an operator may decide if and/or when to dedicate a carrier to femtocells to maximize the capacity of the network.

In accordance with one or more embodiments of the present disclosure, there are provided techniques for centralized management for pilot pollution mitigation in small cell networks. Small cells, such as femtocells, microcells, and picocells, extend cellular coverage to a neighborhood in a promising method for achieving substantial gains in capacity and coverage. Since small cells are deployed in an unplanned manner (e.g., in residential or enterprise environment) the small cells may create much higher interference magnitude, signal variability and result in large regions that have overlapping coverage areas, also known as pilot pollution, from multiple femtocells. Pilot pollution affects both capacity and connected mode mobility. Therefore, such deployments require transmit power management strategies to improve signal to interference and noise ratio (SINR) while mitigating pilot pollution. Centralized methods are provided to mitigate pilot pollution and to improve SINR in the network.

FIG. 6 illustrates pilot pollution 602 in a small cell network environment 600. A small cell network 600 with cells 604, 606, 608, 610 operating in open or hybrid mode may present various issues with respect to providing coverage and capacity. Since the deployment of such cells is unplanned, transmissions at a constant transmit power from the various cells may result in excessive interference magnitudes and overlapping coverage regions 602 between the cells, and pilot pollution may result.

Pilot pollution may cause (i) SINR degradation which results in lower channel quality indication (CQI) and higher hybrid automatic repeat request (HARQ), retransmissions causing lower throughput, and (ii) frequent handovers between cells may affect certain applications running on a mobile device such as transmission control protocol (TCP) applications, real-time streaming video, other low latency applications, etc.

A method to establish optimal pilot pollution mitigation performance may use a centralized approach. Centralized methods and algorithms for transmit power calibration of femtocell networks are provided. The techniques identify pilot pollution and describe actions that may follow. The identification of pilot pollution may be performed based on (i) measurements taken at the femtocell using a network listen module, (ii) measurement report messages (e.g., intra, inter, and inter radio access technology (RAT)) from a mobile connected to the femtocell, (iii) information from idle user registration, (iv) information from active user handover, and (v) UE handover history information. Based on the above information, femtocell resources such as power, frequency, and time may be allocated accordingly.

The methods and algorithms rely on the availability of radio frequency (RF) information (e.g., PL, macro RSSI, Ecp/Io, etc.) in and/or around the desired coverage area through mobile measurement reports obtained by femtocell users or any other method. The procedures described may be performed by a central entity or by a femtocell including an anchor or controller femtocell, or by any other network entity. Those of skill will recognize that the methods and algorithms may be applicable to various technologies such as UMTS, LTE, 1×/DO.

Figure 7A:
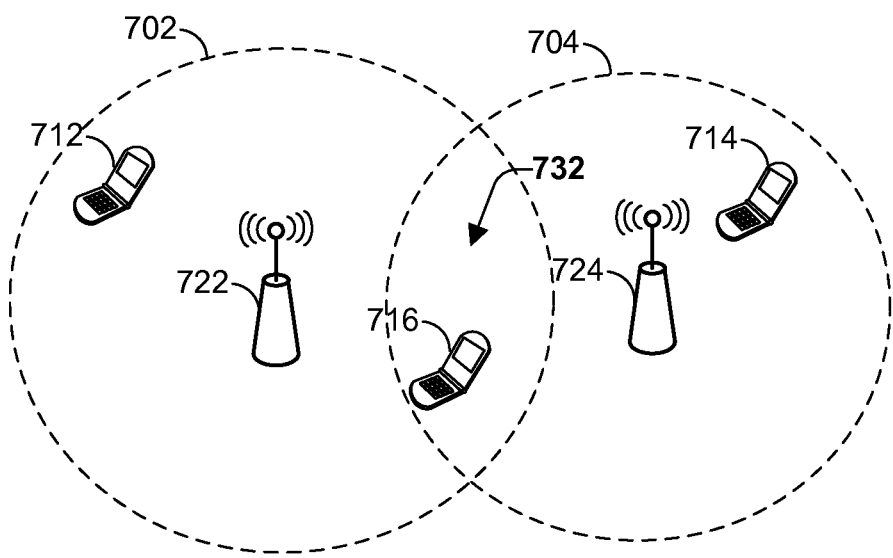
FIGS. 7A-B illustrate mitigating femtocell pilot pollution using an RSCP area minimization function.
Figure 7B:
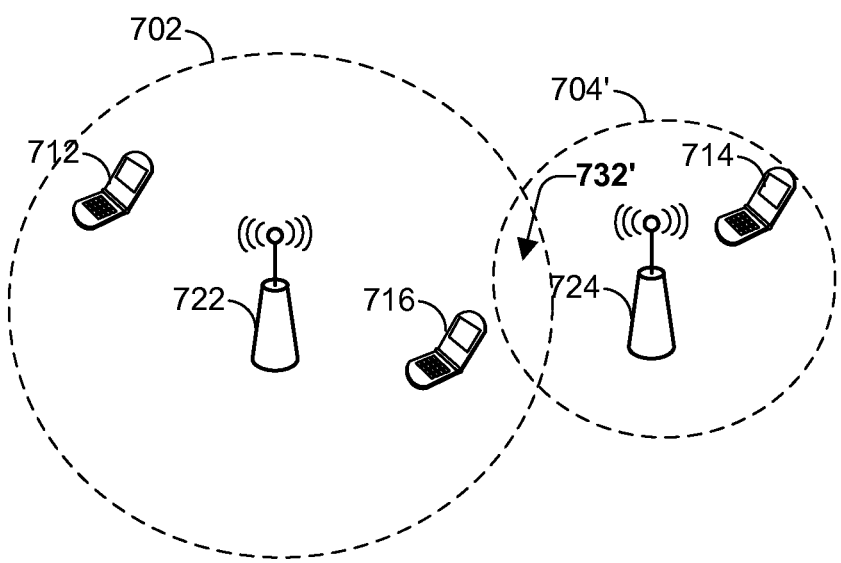

FIGS. 7A-B illustrate mitigating femtocell pilot pollution using an RSCP area minimization function. Centralized management may be expressed as an optimization function. For example, an optimization function may include minimizing the area where the received signal code power (RSCP) from the strongest, and from the second strongest femtocells are within a threshold of each other (i.e., their difference is less than the threshold). For example, the strongest and second strongest femtocells may be within 3 dB or 6 dB of each other. The minimization function may be expressed symbolically, for example, as the minimum of:

$$\sum_{k=1}^{N} I(RSCP_{k,max} - RSCP_{k,2nd\,max} < 3\,\text{dB}),$$

Wherein 'N' is the number of points on a computation grid. The minimization function may be subject to constraints such as the signal quality being maintained and the transmit power level being within predetermined bounds. For example, CPICH may be subject to the constraint $$CPICH \frac{E_{c,i}}{I_{o,i}} > -16\,\text{dB},$$

and femtocell power ($P_{femto}$) to the constraint $P_{min} < P_{femto} < 20$ dBM, wherein $P_{femto}$ is limited to integer values.

Channel resources may include any combination of time, bandwidth, or power. In the example illustrated in FIGS. 7A-B, two femtocells 722, 724 are serving UEs 712, 714, 716. The coverage areas 702, 704 of femtocells 722, 724, respectively, are in proximity and form an overlapping coverage area 732. UE 716 is in the overlapping coverage area 732 and experiences interference and pilot pollution from the two femtocells 722, 724.

Pilot pollution may be reduced by minimizing the area where RSCPs from the strongest and second strongest femtocells are within a threshold value of each other (e.g., the difference between the RSCP values is less than a certain threshold). For example, UE 716 takes measurements of the RSCP for the femtocells 722, 724 at 60 dB and 62 dB respectively. Femtocell 722 may receive the RSCPs from UE 716, e.g., via measurement reports from the UE 716. Femtocell 722 or a network entity (not shown) in communication with Femtocell 722 may determine that the RSCPs (60 dB and 62 dB) are within a threshold of 3 dB of each other. The RSCPs being within a threshold value of each other may indicate pilot pollution. For example, the femtocell 722 may determine an adjustment for minimizing the area of overlap at the UE 716. Femtocell 722 may determine a reduction in transmit power for femtocell 724.

The adjustment may be constrained by a signal quality or transmit power level. For example, UE 714 is served by femtocell 724, and the transmit power adjustment may be determined so as not to deny coverage to the UE 714 by excessively shrinking the coverage area to exclude UE 714. Alternatively or in addition, femtocell 722 may determine a reduction in the frequency band allocation or transmission time allocation for femtocell 724. Femtocell 722 sends the adjustment to femtocell 724, e.g., via a backhaul.

FIG. 7B illustrates the effect of the adjustment to femtocell 724. Femtocell 724 performs the indicated adjustment after receiving the adjustment from femtocell 722. For example, femtocell 724 reduces its transmit power. The reduced coverage area 704' no longer encompasses UE 716. The area of coverage overlap 732' is also reduced because femtocell 724 has reduced its transmit power. UE 714 remains within the coverage area of femtocell 724.

Figure 8A:
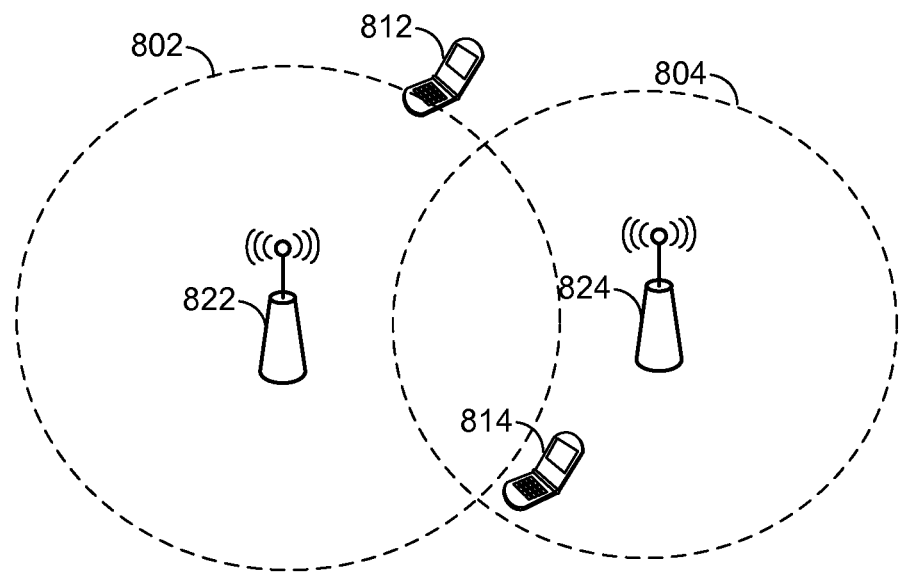
FIGS. 8A-B illustrate mitigating femtocell pilot pollution by maximizing a sum of the maximum SNR value at a location.
Figure 8B:
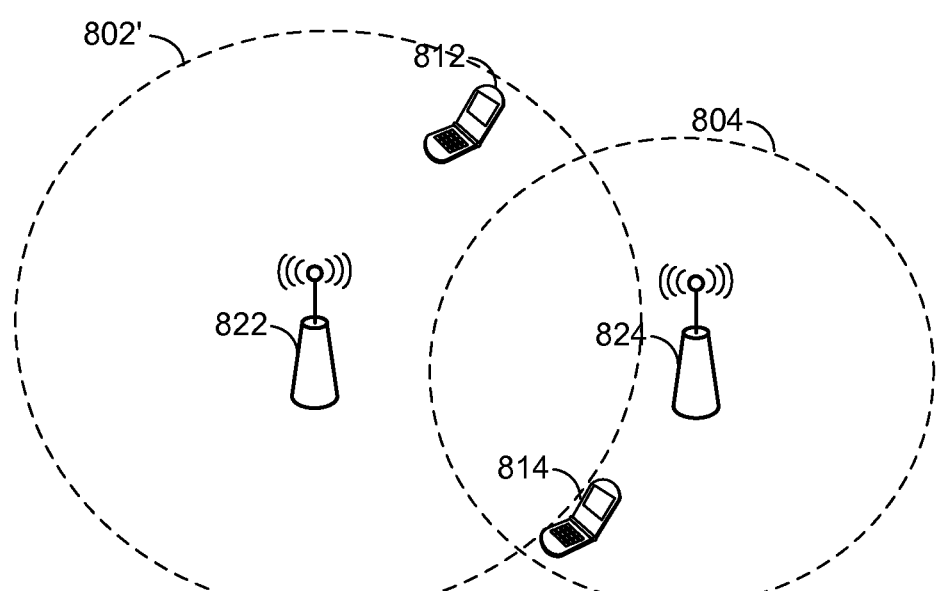

FIGS. 8A-B illustrate mitigating femtocell pilot pollution by maximizing a sum of the maximum SINR value at a location. An optimization function may include maximizing the sum of the $SINR^{max}$ across femtocells covering a location, which may be expressed as the cost function $\Sigma_{k=1}^{N} SINR_{k}^{max}$. The maximization function may be subject to constraints such as the signal quality being maintained and the transmit power level being within predetermined bounds. For example, CPICH may be subject to the constraint $$CPICH \frac{E_{c,i}}{I_{o,i}} > -16 \text{ dB},$$

and femtocell power ($P_{femto}$) to the constraint $P_{min} < P_{femto} < 20$ dBM, wherein $P_{femto}$ is limited to integer values. Channel resources may include any combination of time, bandwidth, or power.

In the example illustrated in FIGS. 8A-B, two femtocells 822, 824 are in the vicinity of UEs 812 and 814. UE 812 takes measurements for the femtocells 822, 824. Femtocell 822 may receive the measurements from UE 812, e.g., via measurement reports from the UE 812. Femtocell 822 or a network entity (not shown) in communication with femtocell 822 may determine to maximize the sum of the maximum SINR for the femtocells covering the location at the UE 812. Femtocell 822 may determine to increase its transmit power. The adjustment may be constrained by a signal quality or transmit power level. For example, UE 814 is served by femtocell 824, and the transmit power adjustment may be determined so as not to introduce significant interference to UE 814 by excessively enlarging the coverage area 802. Alternatively or in addition, femtocell 822 may determine a reduction in the frequency band allocation or transmission time allocation for femtocell 822. FIG. 8B illustrates the effect of the adjustment to femtocell 822. Femtocell 822 performs the determined adjustment. The enlarged coverage area 802' provides better SINR to UE 812. UE 814 does not experience significant additional interference.

Figure 9A:
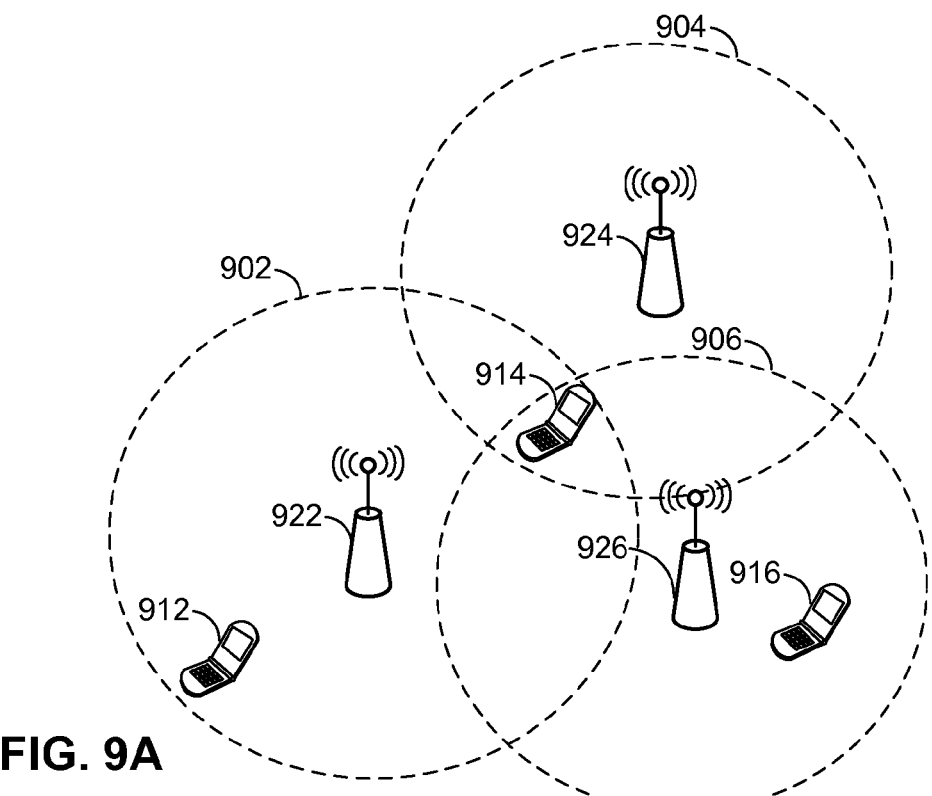
FIGS. 9A-B illustrate mitigating femtocell pilot pollution by minimizing the area with a number of pilots within a threshold of the strongest pilot.
Figure 9B:
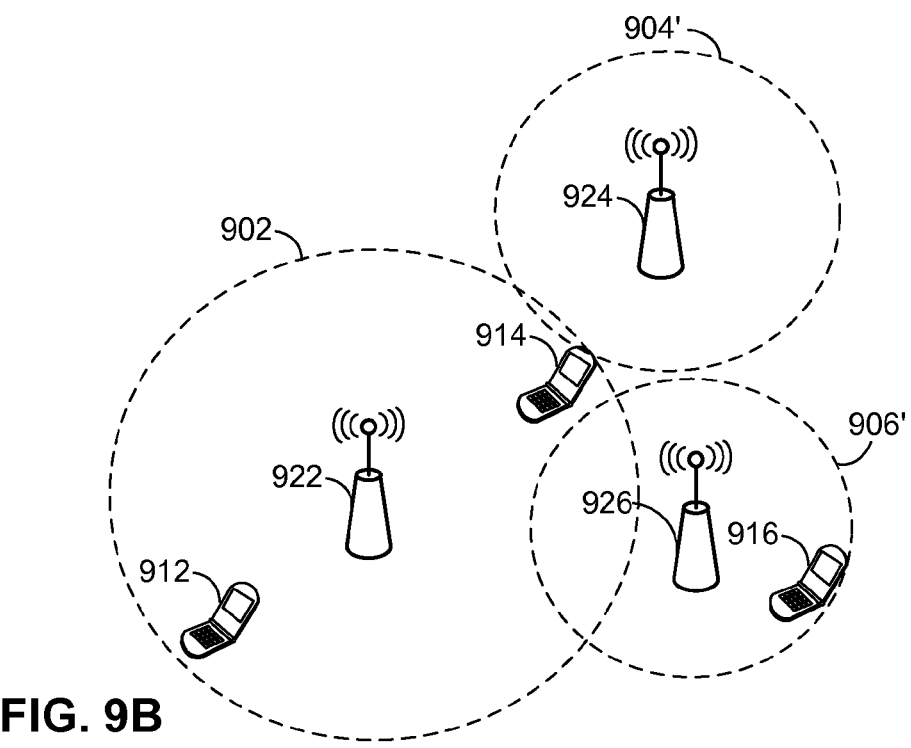

FIGS. 9A-B illustrate mitigating femtocell pilot pollution by minimizing the area with a number of pilots within a threshold of the strongest pilot. An optimization function may include minimizing an area with a number of pilots within a threshold of the strongest pilot. The minimization function may be subject to constraints such as the signal quality being maintained and the transmit power level being within predetermined bounds, as described in more detail in connections with FIGS. 8A-B above. Channel resources may include any combination of time, bandwidth, or power.

In the example illustrated in FIGS. 9A-B, femtocells 922, 924, 926 are serving UEs 912, 914, 916. UE 914 is in the overlapping coverage area and experiences interference and pilot pollution from the three femtocells 922, 924, 926. Pilot pollution may be reduced by minimizing the coverage areas of respective femtocells at the location with the pilots being within a threshold of a strongest pilot. For example, UE 914 takes measurements of the femtocells 922, 924, 926 at 60 dB, 62 dB, and 62 dB respectively. Femtocell 922 may receive the measurements from UE 914, e.g., via measurement reports from the UE 914. Femtocell 922 or a network entity (not shown) in communication with femtocell 922 may determine to minimizing the coverage areas of respective femtocells at the location of UE 914. For example, the femtocell 922 may determine an adjustment for minimizing the area of overlap at the UE 914.

Femtocell 922 may determine a reduction in transmit power for femtocells 924, 926. The adjustment may be constrained by a signal quality or transmit power level. For example, UE 916 is served by femtocell 926, and the transmit power adjustment may be determined so as not to deny coverage to the UE 916 by excessively shrinking the coverage area to exclude UE 916. Alternatively or in addition, femtocell 922 may determine a reduction in the frequency band allocation or transmission time allocation for femtocells 924, 926. Femtocell 922 may send the adjustment to femtocells 924, 926, e.g., via a backhaul.

FIG. 9B illustrates the effect of the adjustment to femtocells 924, 926. Femtocells 924, 926 perform the indicated adjustments after receiving the adjustment from femtocell 922. For example, femtocell 924, 926 reduce their transmit power. The reduced coverage areas 904', 906' may no longer encompass UE 914. The area of coverage overlap is also reduced because femtocells 924, 926 have reduced their transmit power. UE 914 remains within the coverage area of femtocell 922.

Figure 10A:
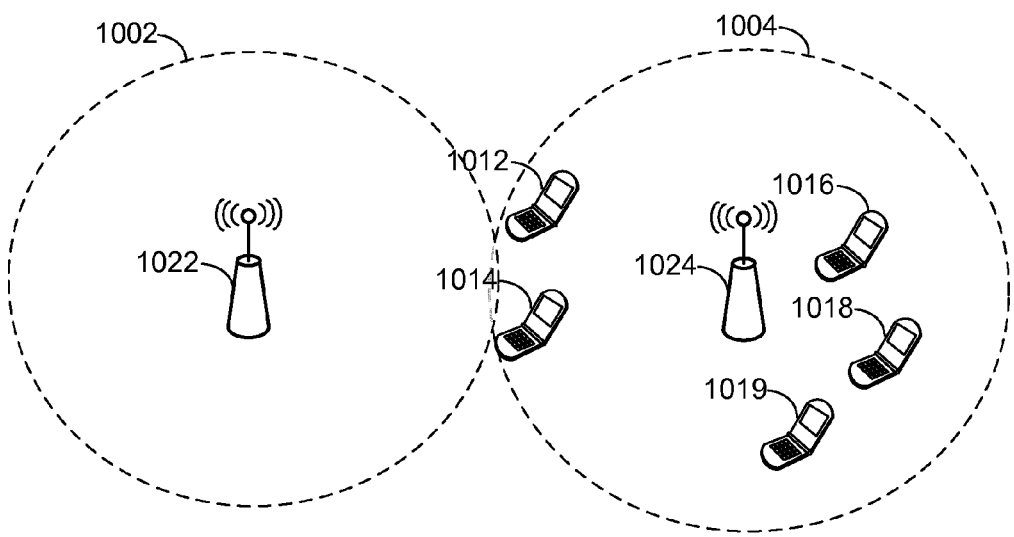
FIGS. 10A-B illustrate maximizing capacity by distributing user traffic load to neighboring cells.
Figure 10B:
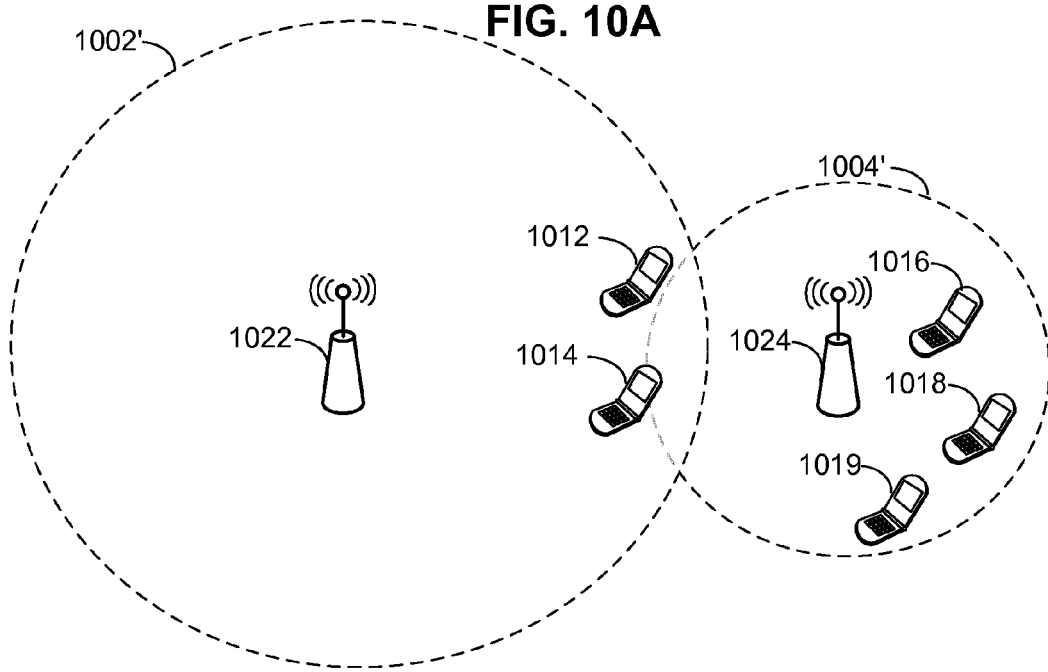

FIGS. 10A-B illustrate maximizing capacity by distributing user traffic load to neighboring cells. An optimization function may include maximizing capacity by uniformly distributing user traffic load to neighboring cells. The transmit power allocation may be performed based on user traffic load. The maximum power may be decreased for a loaded cell, while the minimum power constraint may be increased for an unloaded neighbor. Channel resources may include any combination of time, bandwidth, or power.

In the example illustrated in FIGS. 10A-B, femtocells 1022, 1024 are serving UEs 1012, 1014, 1016, 1018, 1019. The five UEs 1012, 1014, 1016, 1018, 1019 are all currently served by femtocell 1024, while femtocell 1022 is not serving any UEs. Capacity can be improved by distributing the user traffic load from femtocell 1024 to 1022. For example, measurement reports from UEs, including UEs 1012, 1014, 1016, 1018, 1019, may be received by femtocells 1022, 1024. Femtocell 1022 or a network entity (not shown) in communication with femtocell 1022 may determine to maximize capacity by distributing user traffic load to neighboring femtocells. For example, the Femtocell 1022 may determine an adjustment to offload user traffic load from femtocell 1024. Femtocell 1022 may determine an increase in transmit power for femtocell 1022 and a decrease in transmit power for femtocell 1024. The adjustment may be constrained by a signal quality or transmit power level. Alternatively or in addition, Femtocell 1022 may determine an increase or reduction in the frequency band allocation or transmission time allocation for femtocells 1022, 1024. Femtocell 1022 determines the adjustments for itself and femtocell 1024. Femtocell 1022 sends adjustments for femtocell 1024, e.g., via a backhaul.

FIG. 10B illustrates the effect of the adjustment to femtocells 1022, 1024. Femtocells 1022, 1024 perform the indicated adjustments. For example, femtocell 1022 increases its transmit power whereas femtocell 1024 reduces its transmit power. The increased coverage area 1002' of femtocell 1022 may encompass UEs 1012, 1014. The reduced coverage area 1004' of femtocell 1024 may no longer encompass UEs 1012, 1014.

Constraints on the power differential of the femtocells may also be captured. Details of the optimization procedure and solution are further described in the attached Appendices A and B. The optimization issues above may be solved via nonlinear programming methods including numerical approach or an iterative method. In an iterative method, for example, the processes above may be repeated until the desired result is achieved.

Figure 11:
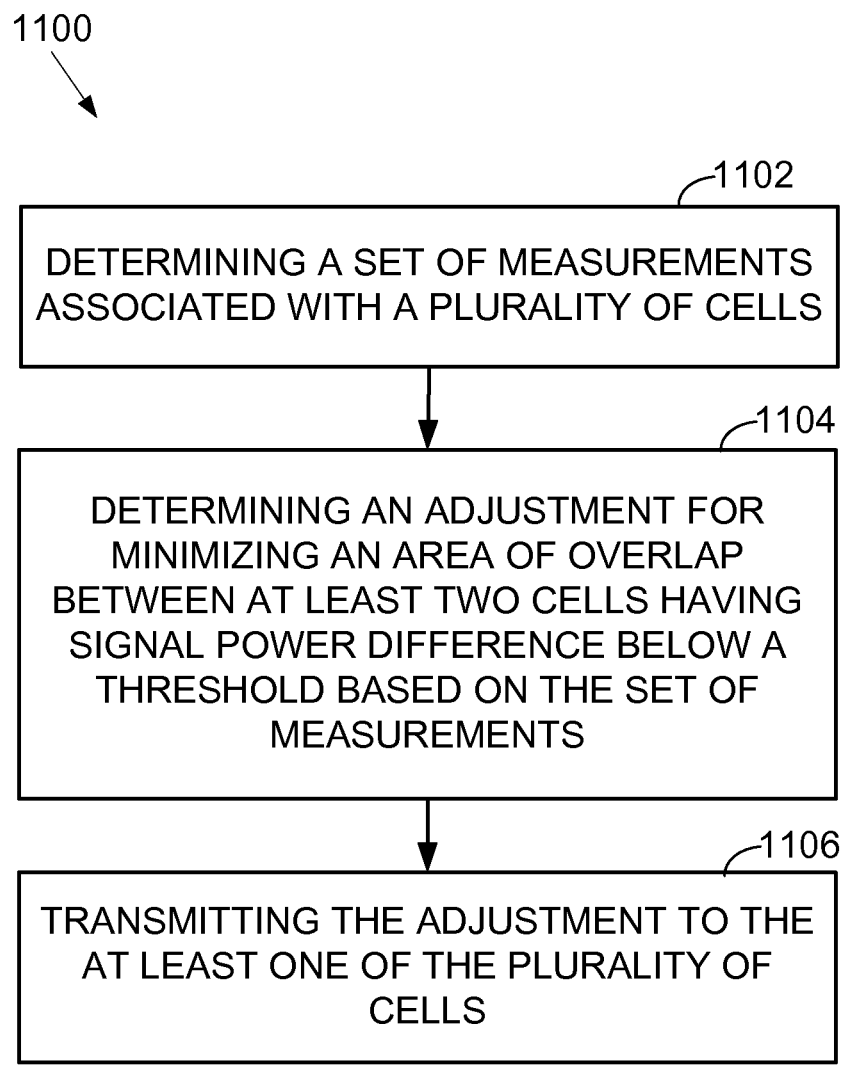
FIG. 11 illustrates aspects of a methodology for mitigating femtocell pilot pollution using an RSCP area minimization function.

In accordance with one or more aspects of the embodiments described herein, with reference to FIG. 11, there is shown a methodology 1100, operable by a network entity, such as, for example, a femocell, a macrocell, a picocell, or the like. Specifically, method 1100 describes a procedure to mitigate pilot pollution using an RSCP area minimization function, for example, as illustrated in FIGS. 7A-B. The method 1100 may include, at 1102, determining a set of measurements associated with a plurality of cells, and detecting pilot cell pollution within a coverage area of the plurality of small cells based on the measurements. The method 1100 may include, at 1104, determining an adjustment of at least one transmission parameter of at least one of the plurality of small cells for reducing the pilot cell pollution, such as an adjustment for minimizing an area of overlap between at least two cells having signal power difference below a threshold based on the set of measurements. The method 1100 may include, at 1106, transmitting the adjustment to the at least one of the plurality of small cells.

Figure 12:
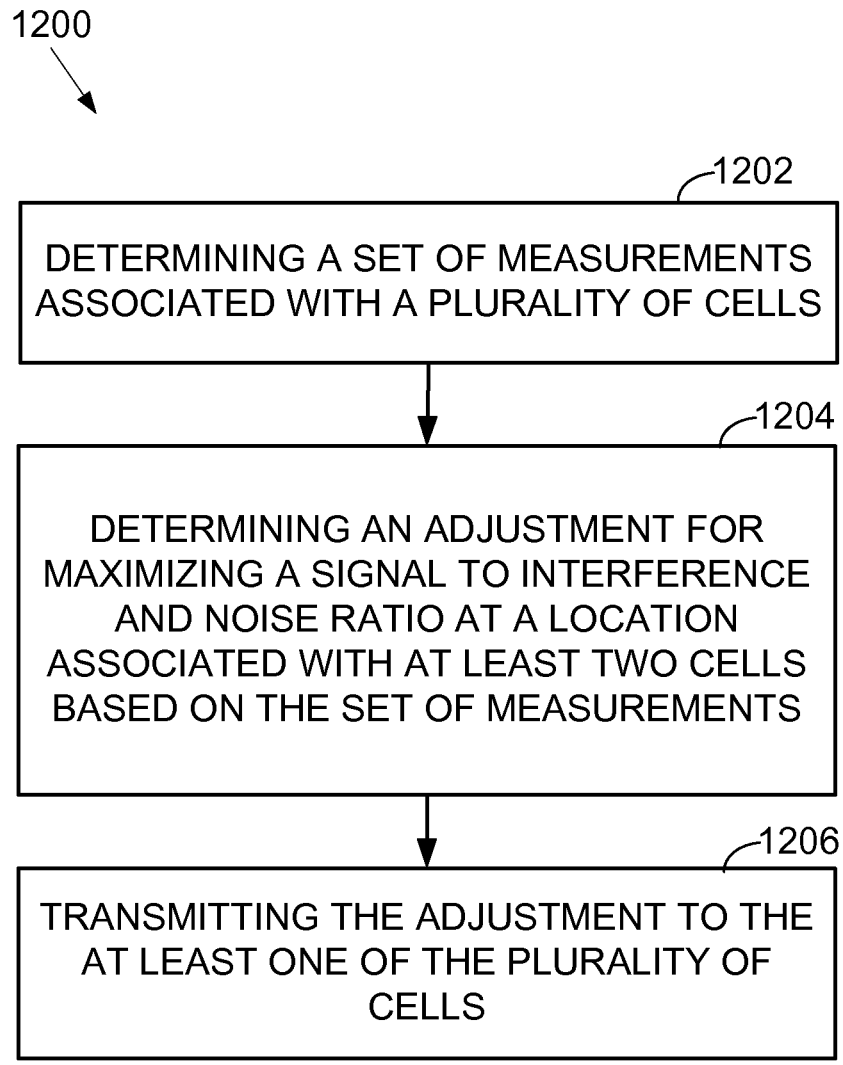
FIG. 12 illustrates aspects of a methodology for mitigating femtocell pilot pollution by maximizing a sum of the maximum SINR value at a location.

In accordance with one or more aspects another one of the embodiments described herein, with reference to FIG. 12, there is shown a methodology 1200, operable by a network entity, such as, for example, a femocell, a macrocell, a picocell, or the like. Specifically, method 1200 describes a procedure to mitigate pilot pollution by maximizing a sum of the maximum SNR value at a location, for example, as illustrated in FIGS. 8A-B. The method 1200 may include, at 1202, determining a set of measurements associated with a plurality of cells, and detecting pilot cell pollution within a coverage area of the plurality of small cells based on the measurements. The method 1200 may include, at 1204, determining an adjustment of at least one transmission parameter of at least one of the plurality of small cells for reducing the pilot cell pollution, such as an adjustment for maximizing a signal to interference and noise ratio at a location associated with at least two cells based on the set of measurements. The method 1200 may include, at 1206, transmitting the adjustment to the at least one of the plurality of small cells.

Figure 13:
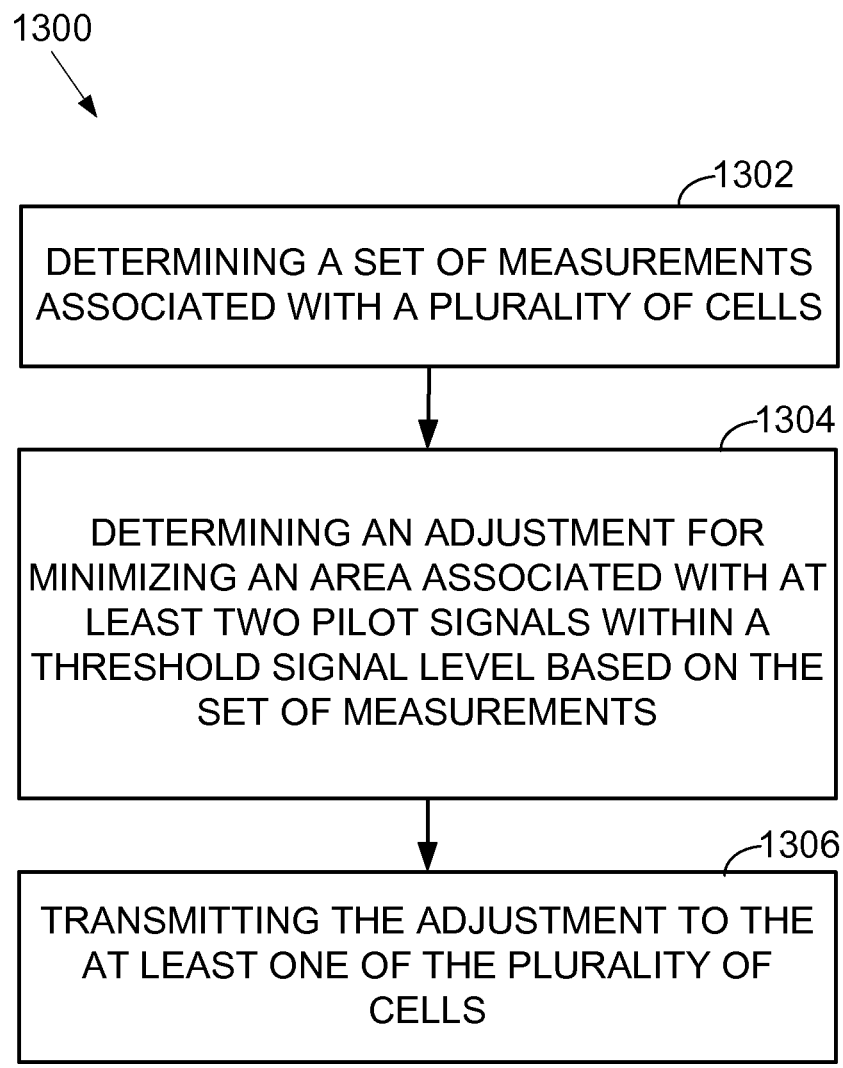
FIG. 13 illustrates aspects of a methodology for mitigating femtocell pilot pollution by minimizing the area with a number of pilots within a threshold of the strongest pilot.

In accordance with one or more aspects another one of the embodiments described herein, with reference to FIG. 13, there is shown a methodology 1300, operable by a network entity, such as, for example, a femtocell, a macrocell, a picocell, or the like. Specifically, method 1300 describes a procedure to mitigate pilot pollution by minimizing the area with a number of pilots within a threshold of the strongest pilot, for example, as illustrated in FIGS. 9A-B. The method 1300 may include, at 1302, determining a set of measurements associated with a plurality of cells, and detecting pilot cell pollution within a coverage area of the plurality of small cells based on the measurements. The method 1300 may include, at 1304, determining an adjustment of at least one transmission parameter of at least one of the plurality of small cells for reducing the pilot cell pollution, such as an adjustment for minimizing an area associated with at least two pilot signals within a threshold signal level based on the set of measurements. The method 1300 may include, at 1306, transmitting the adjustment to the at least one of the plurality of small cells.

Figure 14:
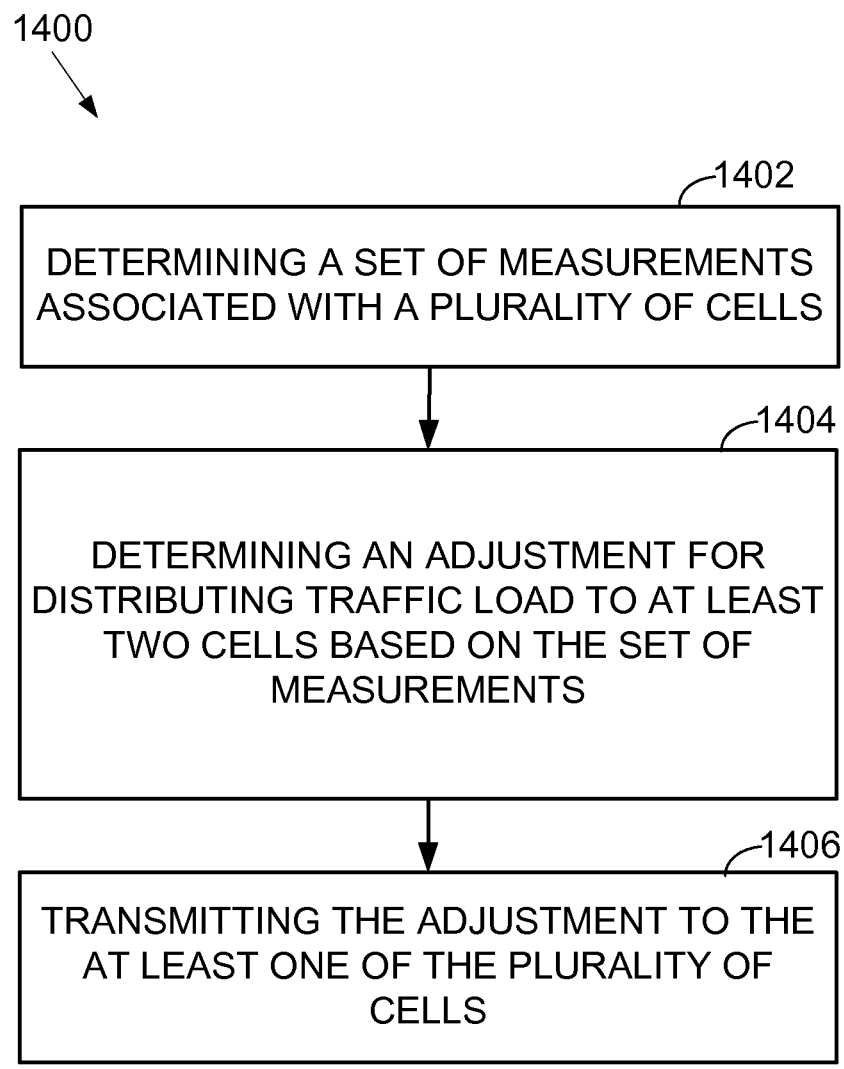
FIG. 14 illustrates aspects of a methodology for maximizing capacity by distributing user traffic load to neighboring cells.

In accordance with one or more aspects another one of the embodiments described herein, with reference to FIG. 14, there is shown a methodology 1400, operable by a network entity, such as, for example, a femocell, a macrocell, a picocell, or the like. Specifically, method 1400 describes a procedure to maximize capacity by distributing user traffic load to neighboring cells, for example, as illustrated in FIGS. 10A-B. The method 1400 may include, at 1402, determining a set of measurements associated with a plurality of cells, and detecting pilot cell pollution within a coverage area of the plurality of small cells based on the measurements. The method 1400 may include, at 1404, determining an adjustment of at least one transmission parameter of at least one of the plurality of small cells for reducing the pilot cell pollution, such as an adjustment for distributing traffic load to at least two cells based on the set of measurements. The method 1400 may include, at 1406, transmitting the adjustment to the at least one of the plurality of small cells.

Figure 15:
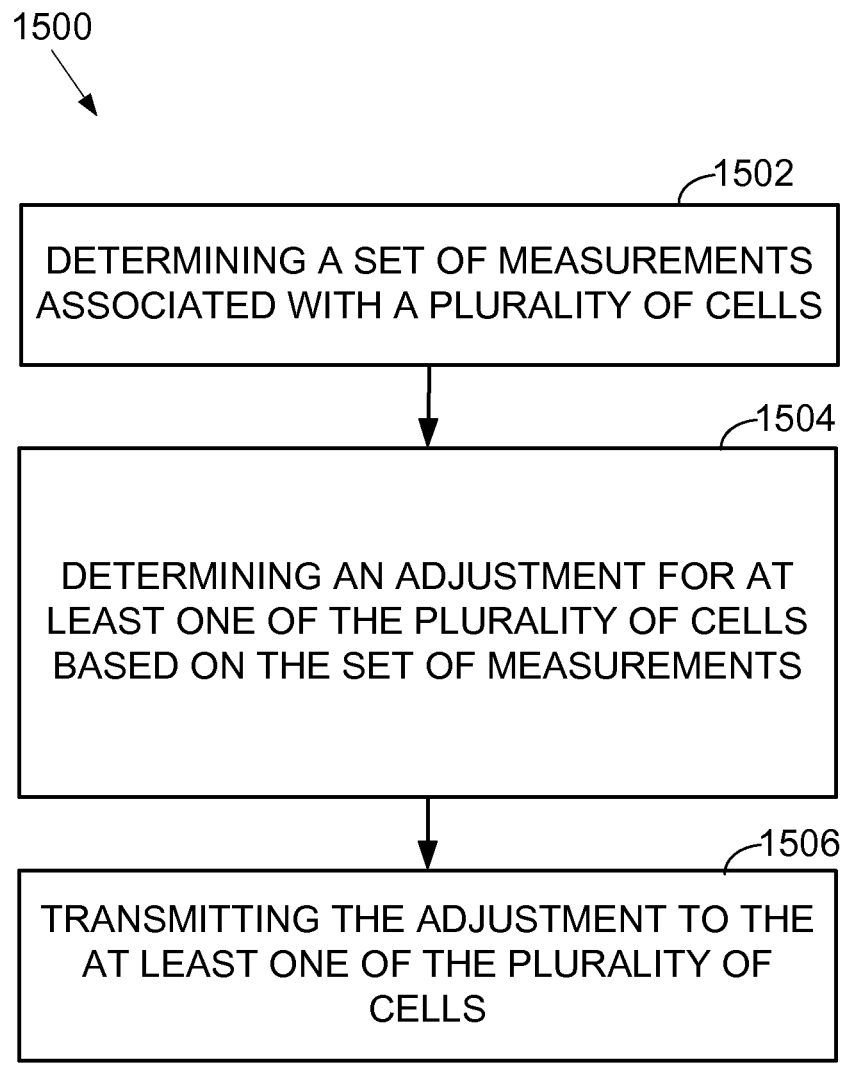
FIG. 15 illustrates aspects of a methodology for mitigating pilot pollution.

In accordance with one or more aspects another one of the embodiments described herein, with reference to FIG. 15, there is shown a methodology 1500, operable by a network entity, such as, for example, a femocell, a macrocell, a picocell, or the like. Specifically, method 1500 describes a procedure to mitigate pilot pollution. The method 1500 may include, at 1502, determining a set of measurements associated with a plurality of cells. Optionally, the method 1500 may include detecting pilot cell pollution within a coverage area of the plurality of small cells based on the measurements. The method 1500 may include, at 1504, determining an adjustment of at least one transmission parameter for at least one of the plurality of small cells based on the set of measurements. The method 1500 may include, at 1506, transmitting the adjustment to the at least one of the plurality of small cells.

Figure 16:
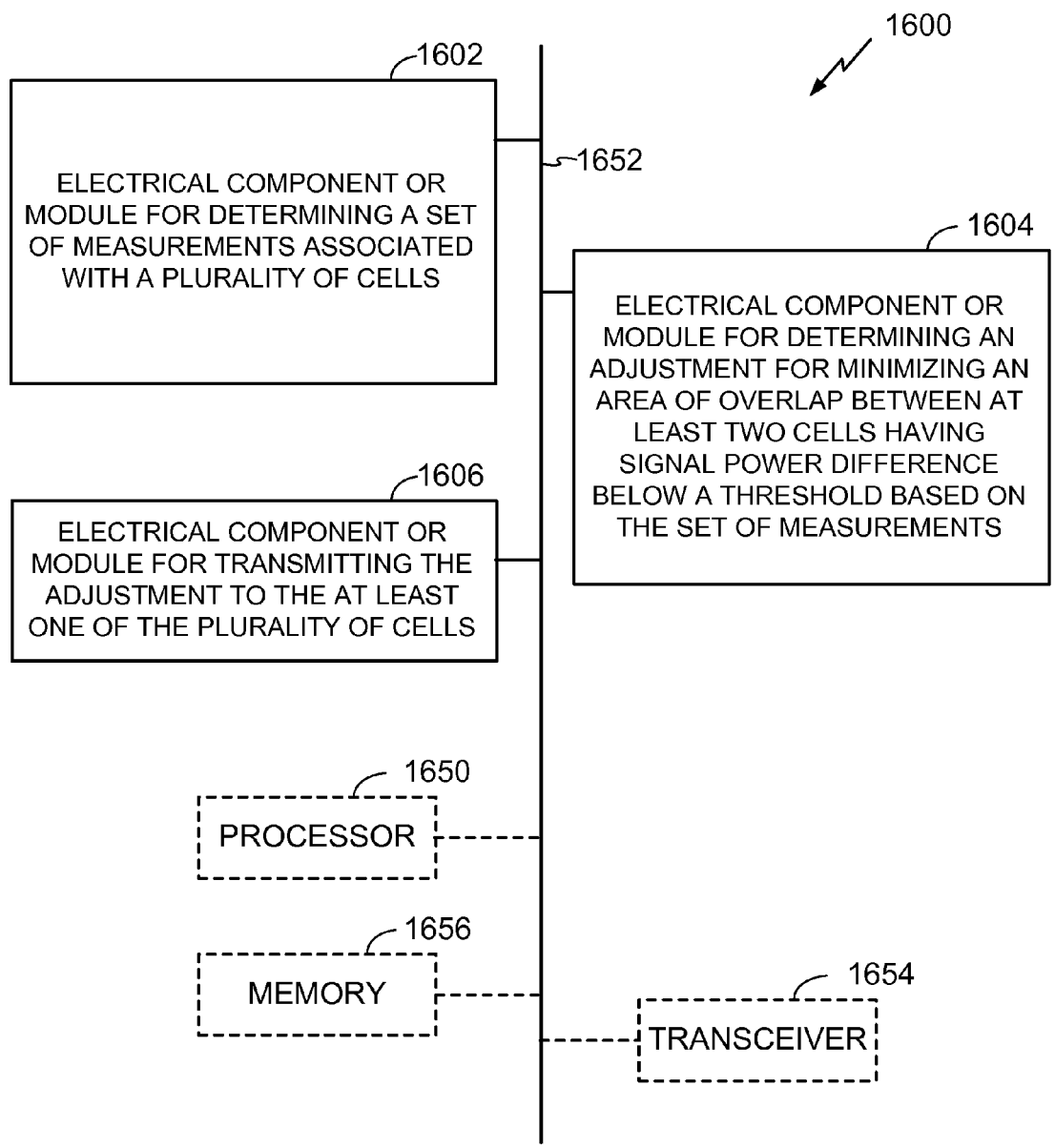
FIG. 16 shows an embodiment of an apparatus for mitigating femtocell pilot pollution using an RSCP area minimization function, in accordance with the methodologies of FIG. 11.

FIG. 16 shows an embodiment of an apparatus for mitigating pilot pollution using an RSCP area minimization function, in accordance with the methodology of FIG. 11. With reference to FIG. 16, there is provided an exemplary apparatus 1600 that may be configured as a network entity (e.g., a femocell, a macrocell, a picocell, or the like) in a wireless network, or as a processor or similar device/component for use within the network entity. The apparatus 1600 may include functional blocks that can represent functions implemented by a processor, software, or combination thereof (e.g., firmware). For example, apparatus 1600 may include an electrical component or module 1602 for determining a set of measurements associated with a plurality of cells. The apparatus 1600 may include an electrical component or module 1604 for determining an adjustment for minimizing an area of overlap between at least two cells having signal power difference below a threshold based on the set of measurements. The apparatus 1600 may include an electrical component or module 1606 for transmitting the adjustment to the at least one of the plurality of cells. Each of the components 1602, 1604, 1606 may comprise means for performing the respective illustrated functions, including, for example, a processor in a femtocell or the like performing corresponding ones of the more detailed algorithms described for a small cell in connection with FIGS. 7A-B above.

In related aspects, the apparatus 1600 may optionally include a processor component 1650 having at least one processor, in the case of the apparatus 1600 configured as a network entity (e.g., a femocell, a macrocell, a picocell, or the like), rather than as a processor. The processor 1650, in such case, may be in operative communication with the components 1602-1606 via a bus 1652 or similar communication coupling. The processor 1650 may effect initiation and scheduling of the processes or functions performed by electrical components 1602-1606.

In further related aspects, the apparatus 1600 may include a radio transceiver component 1654. A stand alone receiver and/or stand alone transmitter may be used in lieu of or in conjunction with the transceiver 1654. When the apparatus 1600 is a network entity, the apparatus 1600 may also include a network interface (not shown) for connecting to one or more core network entities. The apparatus 1600 may optionally include a component for storing information, such as, for example, a memory device/component 1656. The computer readable medium or the memory component 1656 may be operatively coupled to the other components of the apparatus 1600 via the bus 1652 or the like. The memory component 1656 may be adapted to store computer readable instructions and data for effecting the processes and behavior of the components 1602-1606, and subcomponents thereof, or the processor 1650, or the methods disclosed herein. The memory component 1656 may retain instructions for executing functions associated with the components 1602-1606. While shown as being external to the memory 1656, it is to be understood that the components 1602-1606 can exist within the memory 1656. It is further noted that the components in FIG. 16 may comprise processors, electronic devices, hardware devices, electronic sub-components, logical circuits, memories, software codes, firmware codes, etc., or any combination thereof.

Figure 17:
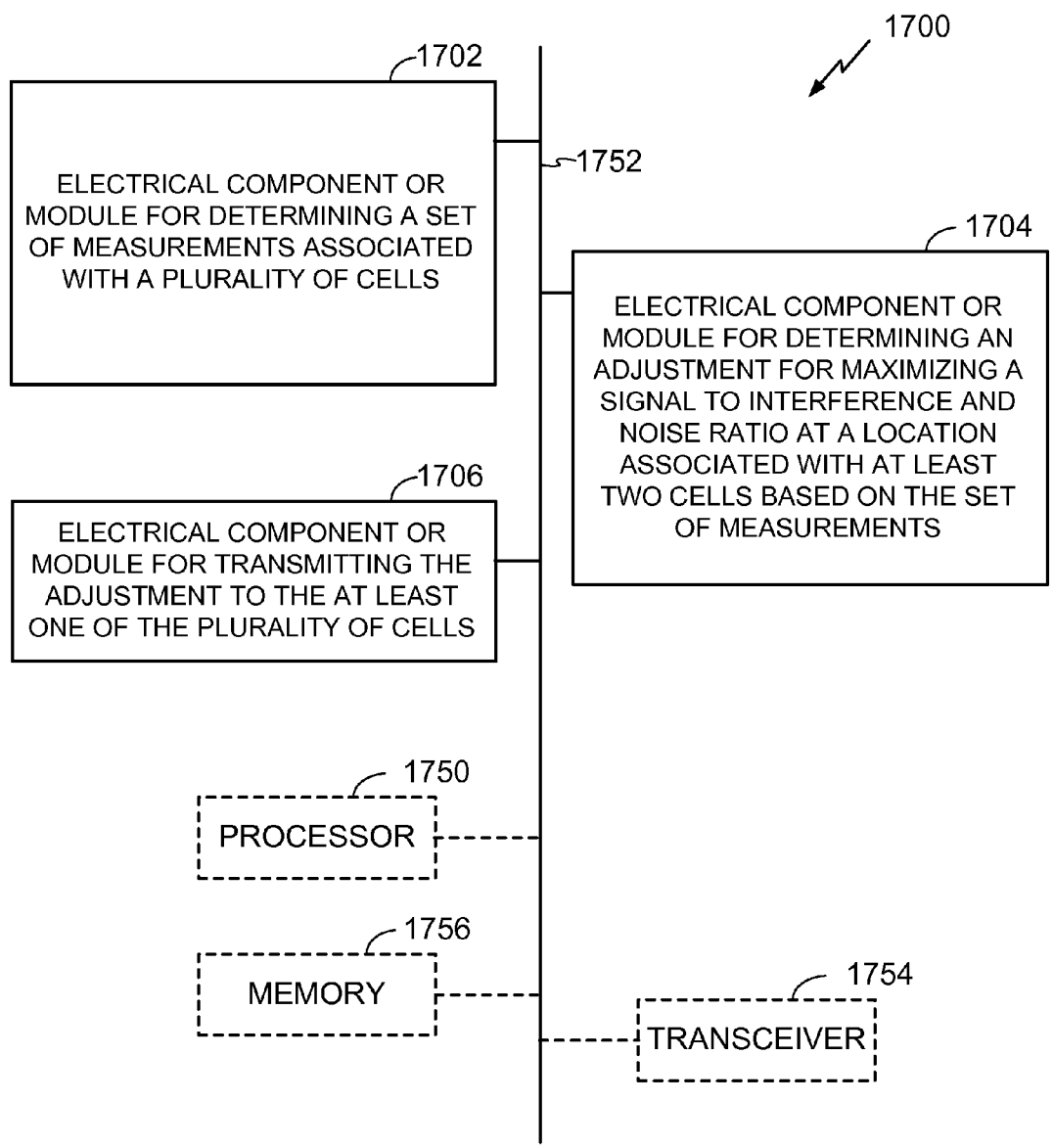
FIG. 17 shows an embodiment of an apparatus for mitigating femtocell pilot pollution by maximizing a sum of the maximum SINR value at a location, in accordance with the methodologies of FIG. 12.

FIG. 17 shows an embodiment of an apparatus for mitigating pilot pollution by maximizing a sum of the maximum SINR value at a location, in accordance with the methodology of FIG. 12. With reference to FIG. 17, there is provided an exemplary apparatus 1700 that may be configured as a network entity (e.g., a femocell, a macrocell, a picocell, or the like) in a wireless network, or as a processor or similar device/component for use within the network entity. The apparatus 1700 may include functional blocks that can represent functions implemented by a processor, software, or combination thereof (e.g., firmware). For example, apparatus 1700 may include an electrical component or module 1702 for determining a set of measurements associated with a plurality of cells. The apparatus 1700 may include an electrical component or module 1704 for determining an adjustment for maximizing a signal to interference and noise ratio at a location associated with at least two cells based on the set of measurements. The apparatus 1700 may include an electrical component or module 1706 for transmitting the adjustment to the at least one of the plurality of cells. Each of the components 1702, 1704, 1706 may comprise means for performing the respective illustrated functions, including, for example, a processor in a femtocell or the like performing corresponding ones of the more detailed algorithms described for a small cell in connection with FIGS. 8A-B above.

In related aspects, the apparatus 1700 may optionally include a processor component 1750 having at least one processor, in the case of the apparatus 1700 configured as a network entity (e.g., a femocell, a macrocell, a picocell, or the like), rather than as a processor. The processor 1750, in such case, may be in operative communication with the components 1702-1706 via a bus 1752 or similar communication coupling. The processor 1750 may effect initiation and scheduling of the processes or functions performed by electrical components 1702-1706.

In further related aspects, the apparatus 1700 may include a radio transceiver component 1754. A stand alone receiver and/or stand alone transmitter may be used in lieu of or in conjunction with the transceiver 1754. When the apparatus 1700 is a network entity, the apparatus 1700 may also include a network interface (not shown) for connecting to one or more core network entities. The apparatus 1700 may optionally include a component for storing information, such as, for example, a memory device/component 1756. The computer readable medium or the memory component 1756 may be operatively coupled to the other components of the apparatus 1700 via the bus 1752 or the like. The memory component 1756 may be adapted to store computer readable instructions and data for effecting the processes and behavior of the components 1702-1706, and subcomponents thereof, or the processor 1750, or the methods disclosed herein. The memory component 1756 may retain instructions for executing functions associated with the components 1702-1706. While shown as being external to the memory 1756, it is to be understood that the components 1702-1706 can exist within the memory 1756. It is further noted that the components in FIG. 17 may comprise processors, electronic devices, hardware devices, electronic sub-components, logical circuits, memories, software codes, firmware codes, etc., or any combination thereof.

Figure 18:
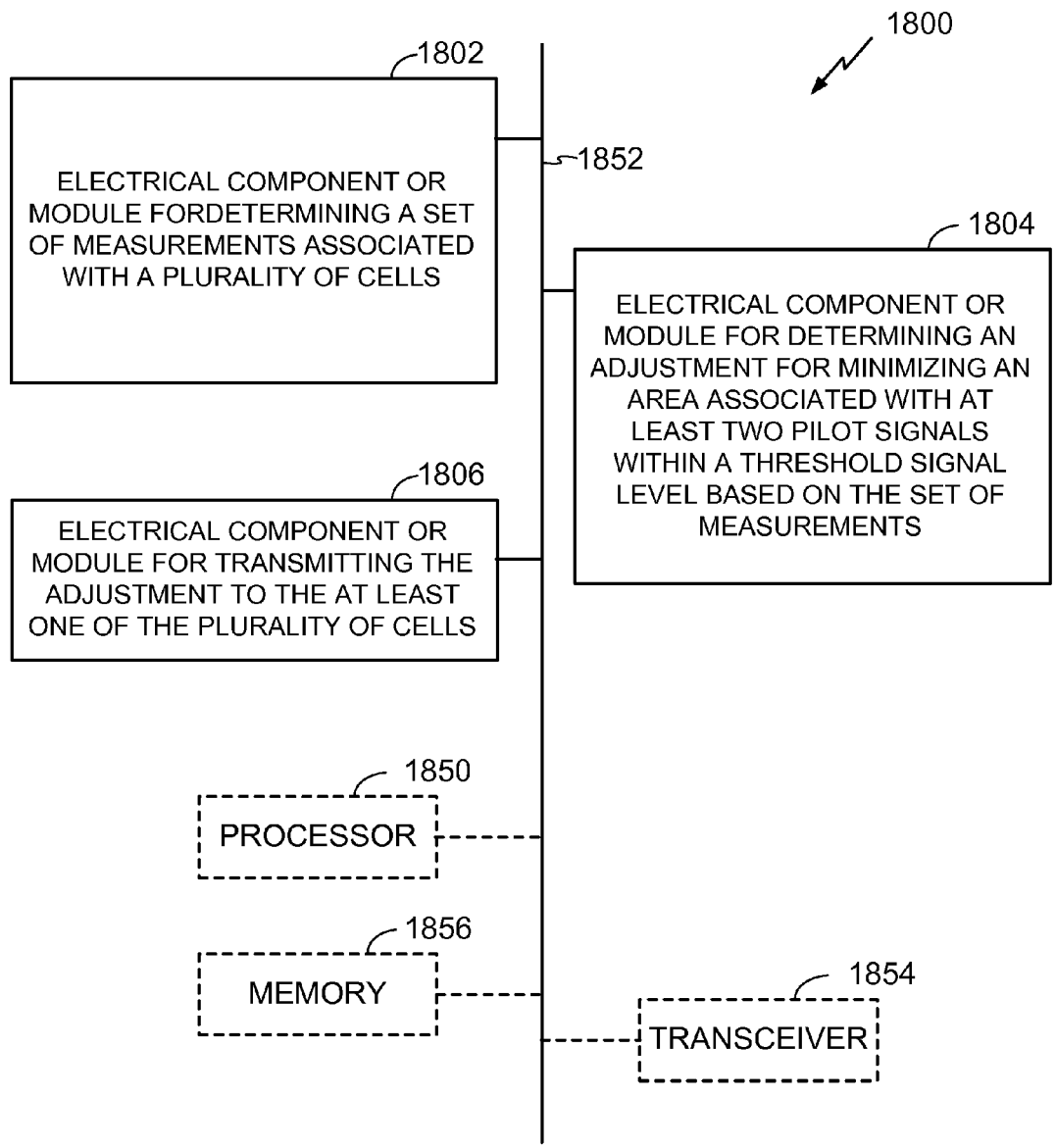
FIG. 18 shows an embodiment of an apparatus for mitigating femtocell pilot pollution by minimizing the area with a number of pilots within a threshold of the strongest pilot, in accordance with the methodologies of FIG. 13.

FIG. 18 shows an embodiment of an apparatus for mitigating pilot pollution by minimizing the area with a number of pilots within a threshold of the strongest pilot, in accordance with the methodology of FIG. 13. With reference to FIG. 18, there is provided an exemplary apparatus 1800 that may be configured as a network entity (e.g., a femocell, a macrocell, a picocell, or the like) in a wireless network, or as a processor or similar device/component for use within the network entity. The apparatus 1800 may include functional blocks that can represent functions implemented by a processor, software, or combination thereof (e.g., firmware). For example, apparatus 1800 may include an electrical component or module 1802 for determining a set of measurements associated with a plurality of cells. The apparatus 1800 may include an electrical component or module 1804 for determining an adjustment for minimizing an area associated with at least two pilot signals within a threshold signal level based on the set of measurements. The apparatus 1800 may include an electrical component or module 1806 for transmitting the adjustment to the at least one of the plurality of cells. Each of the components 1802, 1804, 1806 may comprise means for performing the respective illustrated functions, including, for example, a processor in a femtocell or the like performing corresponding ones of the more detailed algorithms described for a small cell in connection with FIGS. 9A-B above.

In related aspects, the apparatus 1800 may optionally include a processor component 1850 having at least one processor, in the case of the apparatus 1800 configured as a network entity (e.g., a femocell, a macrocell, a picocell, or the like), rather than as a processor. The processor 1850, in such case, may be in operative communication with the components 1802-1806 via a bus 1852 or similar communication coupling. The processor 1850 may effect initiation and scheduling of the processes or functions performed by electrical components 1802-1806.

In further related aspects, the apparatus 1800 may include a radio transceiver component 1854. A stand alone receiver and/or stand alone transmitter may be used in lieu of or in conjunction with the transceiver 1854. When the apparatus 1800 is a network entity, the apparatus 1800 may also include a network interface (not shown) for connecting to one or more core network entities. The apparatus 1800 may optionally include a component for storing information, such as, for example, a memory device/component 1856. The computer readable medium or the memory component 1856 may be operatively coupled to the other components of the apparatus 1800 via the bus 1852 or the like. The memory component 1856 may be adapted to store computer readable instructions and data for effecting the processes and behavior of the components 1802-1806, and subcomponents thereof, or the processor 1850, or the methods disclosed herein. The memory component 1856 may retain instructions for executing functions associated with the components 1802-1806. While shown as being external to the memory 1856, it is to be understood that the components 1802-1806 can exist within the memory 1856. It is further noted that the components in FIG. 18 may comprise processors, electronic devices, hardware devices, electronic sub-components, logical circuits, memories, software codes, firmware codes, etc., or any combination thereof.

Figure 19:
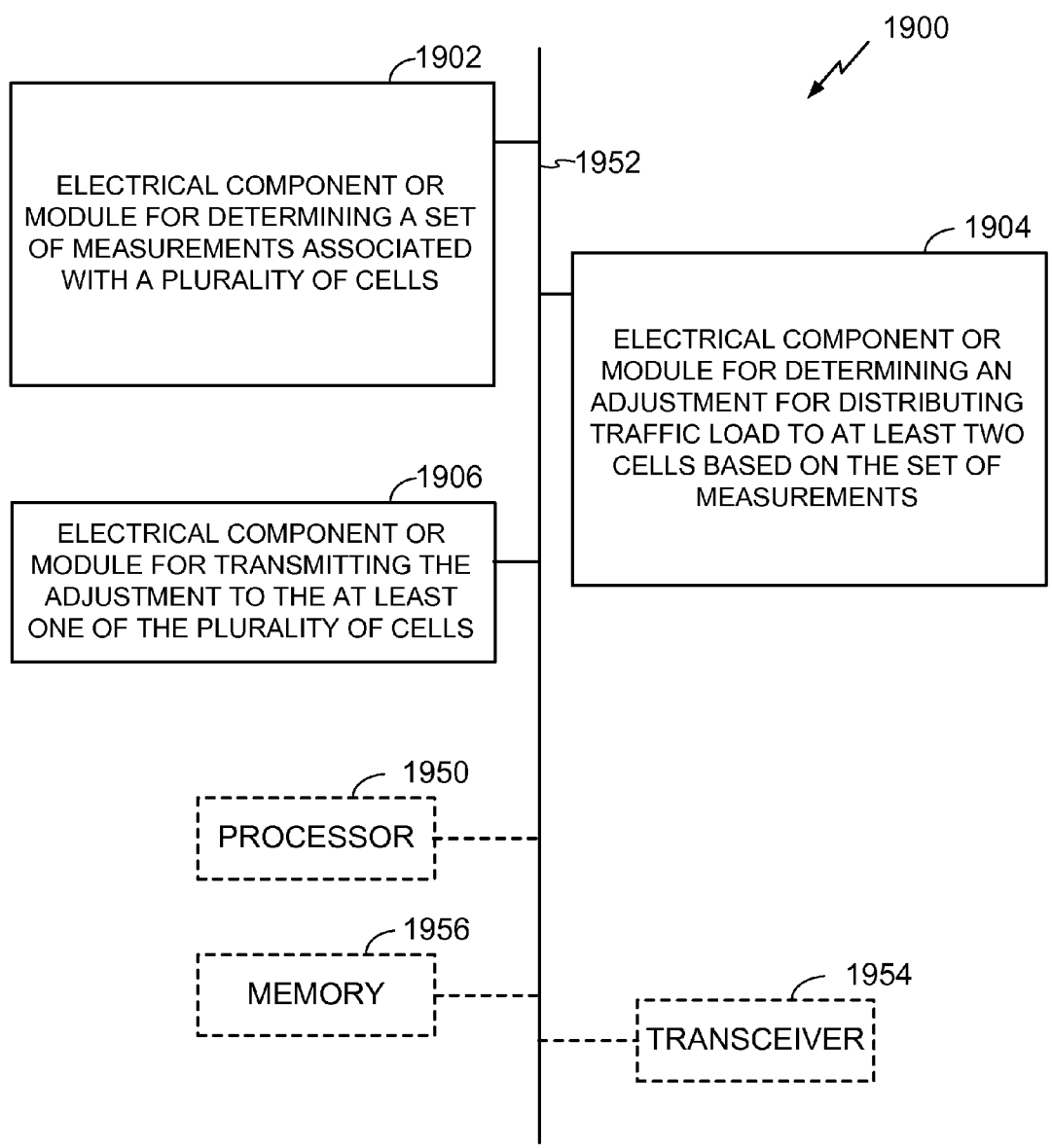
FIG. 19 shows an embodiment of an apparatus for maximizing capacity by distributing user traffic load to neighboring cells, in accordance with the methodologies of FIG. 14.

FIG. 19 shows an embodiment of an apparatus for maximizing capacity by distributing user traffic load to neighboring cells, in accordance with the methodology of FIG. 14. With reference to FIG. 19, there is provided an exemplary apparatus 1900 that may be configured as a network entity (e.g., a femocell, a macrocell, a picocell, or the like) in a wireless network, or as a processor or similar device/component for use within the network entity. The apparatus 1900 may include functional blocks that can represent functions implemented by a processor, software, or combination thereof (e.g., firmware). For example, apparatus 1900 may include an electrical component or module 1902 for determining a set of measurements associated with a plurality of cells. The apparatus 1900 may include an electrical component or module 1904 for determining an adjustment for distributing traffic load to at least two cells based on the set of measurements. The apparatus 1900 may include an electrical component or module 1906 for transmitting the adjustment to the at least one of the plurality of cells. Each of the components 1902, 1904, 1906 may comprise means for performing the respective illustrated functions, including, for example, a processor in a femtocell or the like performing corresponding ones of the more detailed algorithms described for a small cell in connection with FIGS. 10A-B above.

In related aspects, the apparatus 1900 may optionally include a processor component 1950 having at least one processor, in the case of the apparatus 1900 configured as a network entity (e.g., a femocell, a macrocell, a picocell, or the like), rather than as a processor. The processor 1950, in such case, may be in operative communication with the components 1902-1906 via a bus 1952 or similar communication coupling. The processor 1950 may effect initiation and scheduling of the processes or functions performed by electrical components 1902-1906.

In further related aspects, the apparatus 1900 may include a radio transceiver component 1954. A stand alone receiver and/or stand alone transmitter may be used in lieu of or in conjunction with the transceiver 1954. When the apparatus 1900 is a network entity, the apparatus 1900 may also include a network interface (not shown) for connecting to one or more core network entities. The apparatus 1900 may optionally include a component for storing information, such as, for example, a memory device/component 1956. The computer readable medium or the memory component 1956 may be operatively coupled to the other components of the apparatus 1900 via the bus 1952 or the like. The memory component 1956 may be adapted to store computer readable instructions and data for effecting the processes and behavior of the components 1902-1906, and subcomponents thereof, or the processor 1950, or the methods disclosed herein. The memory component 1956 may retain instructions for executing functions associated with the components 1902-1906. While shown as being external to the memory 1956, it is to be understood that the components 1902-1906 can exist within the memory 1956. It is further noted that the components in FIG. 19 may comprise processors, electronic devices, hardware devices, electronic sub-components, logical circuits, memories, software codes, firmware codes, etc., or any combination thereof.

Figure 20:
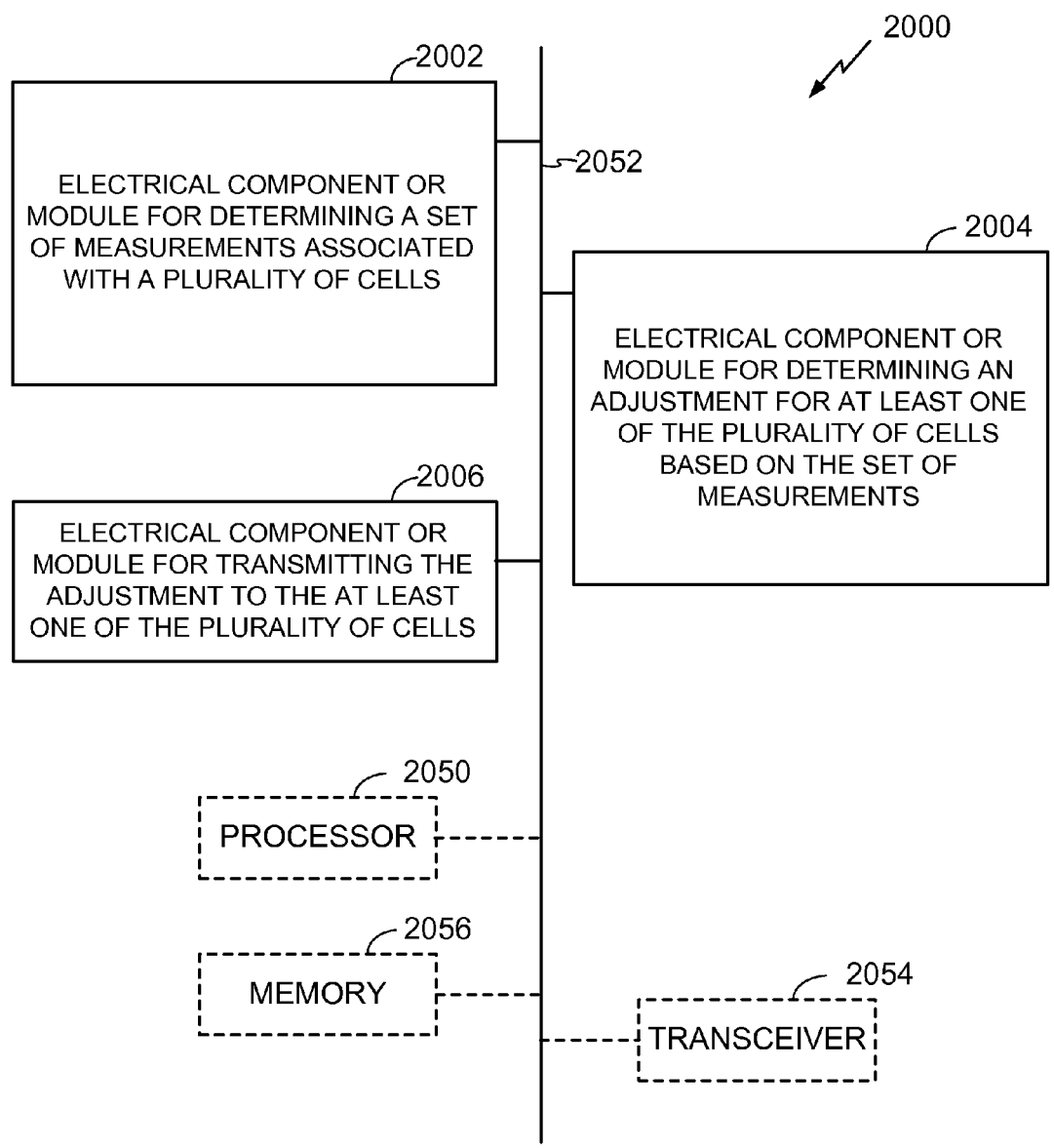
FIG. 20 shows an embodiment of an apparatus for mitigating pilot pollution, in accordance with the methodologies of FIG. 15.

FIG. 20 shows an embodiment of an apparatus for mitigating pilot pollution, in accordance with the methodology of FIG. 15. With reference to FIG. 20, there is provided an exemplary apparatus 2000 that may be configured as a network entity (e.g., a femocell, a macrocell, a picocell, or the like) in a wireless network, or as a processor or similar device/component for use within the network entity. The apparatus 2000 may include functional blocks that can represent functions implemented by a processor, software, or combination thereof (e.g., firmware). For example, apparatus 2000 may include an electrical component or module 2002 for determining a set of measurements associated with a plurality of cells. The apparatus 2000 may include an electrical component or module 2004 for determining an adjustment for at least one of the plurality of cells based on the set of measurements. The apparatus 2000 may include an electrical component or module 2006 for transmitting the adjustment to the at least one of the plurality of cells. Each of the components 2002, 2004, 2006 may comprise means for performing the respective illustrated functions, including, for example, a processor in a femtocell or the like performing corresponding ones of the more detailed algorithms described for a small cell in connection with FIG. 7A-B, 8A-B, 9A-B or 10A-B above.

In related aspects, the apparatus 2000 may optionally include a processor component 2050 having at least one processor, in the case of the apparatus 2000 configured as a network entity (e.g., a femocell, a macrocell, a picocell, or the like), rather than as a processor. The processor 2050, in such case, may be in operative communication with the components 2002-2006 via a bus 2052 or similar communication coupling. The processor 2050 may effect initiation and scheduling of the processes or functions performed by electrical components 2002-2006.

In further related aspects, the apparatus 2000 may include a radio transceiver component 2054. A stand alone receiver and/or stand alone transmitter may be used in lieu of or in conjunction with the transceiver 2054. When the apparatus 2000 is a network entity, the apparatus 2000 may also include a network interface (not shown) for connecting to one or more core network entities. The apparatus 2000 may optionally include a component for storing information, such as, for example, a memory device/component 2056. The computer readable medium or the memory component 2056 may be operatively coupled to the other components of the apparatus 2000 via the bus 2052 or the like. The memory component 2056 may be adapted to store computer readable instructions and data for effecting the processes and behavior of the components 2002-2006, and subcomponents thereof, or the processor 2050, or the methods disclosed herein. The memory component 2056 may retain instructions for executing functions associated with the components 2002-2006. While shown as being external to the memory 2056, it is to be understood that the components 2002-2006 can exist within the memory 2056. It is further noted that the components in FIG. 20 may comprise processors, electronic devices, hardware devices, electronic sub-components, logical circuits, memories, software codes, firmware codes, etc., or any combination thereof.

Figure 21:
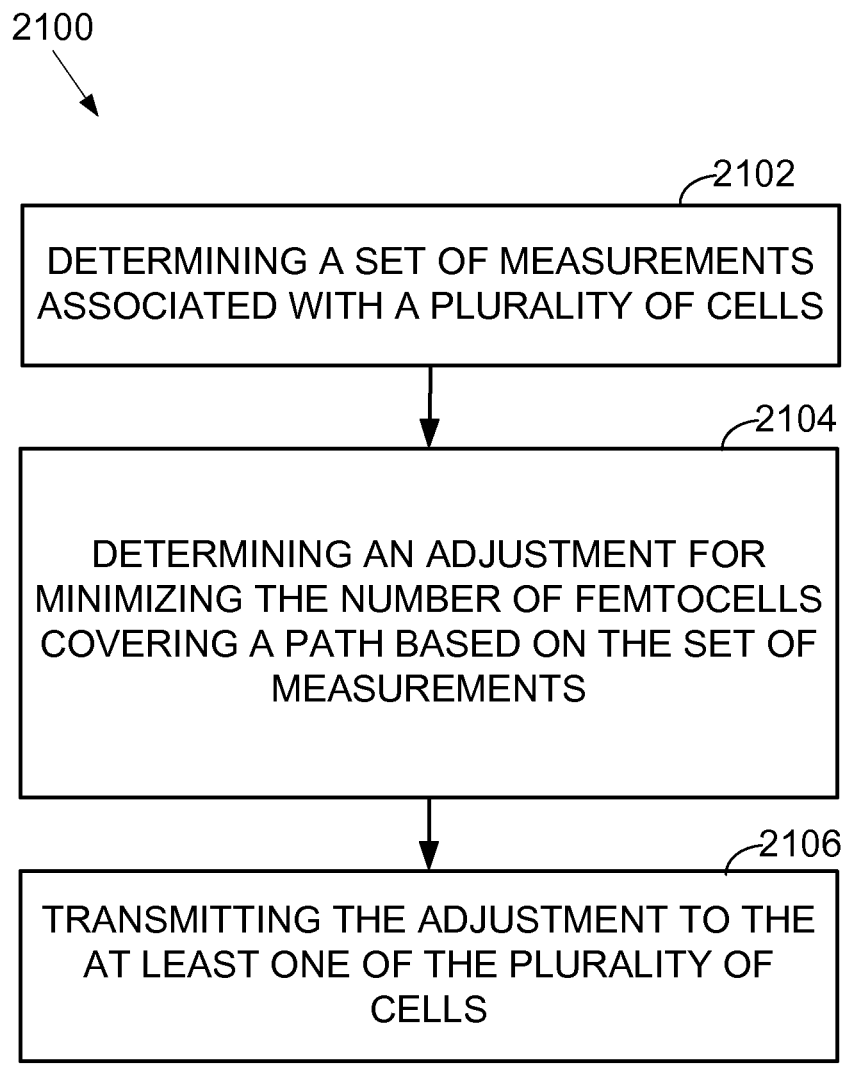
FIG. 21 illustrates aspects of a methodology for mitigating femtocell pilot pollution by minimizing a number of femtocells covering a path.

In accordance with one or more aspects another one of the embodiments described herein, with reference to FIG. 21, there is shown a methodology 2100, operable by a network entity, such as, for example, a femocell, a macrocell, a picocell, or the like. Specifically, method 2100 describes a procedure to mitigate pilot pollution. The method 2100 may include, at 2102, determining a set of measurements associated with a plurality of cells, and detecting pilot cell pollution within a coverage area of the plurality of small cells based on the measurements. The method 2100 may include, at 2104, determining an adjustment of at least one transmission parameter of at least one of the plurality of small cells for reducing the pilot cell pollution, such as an adjustment for minimizing the number of femtocells covering a path based on the set of measurements. The method 2100 may include, at 2106, transmitting the adjustment to the at least one of the plurality of small cells.

Figure 22:
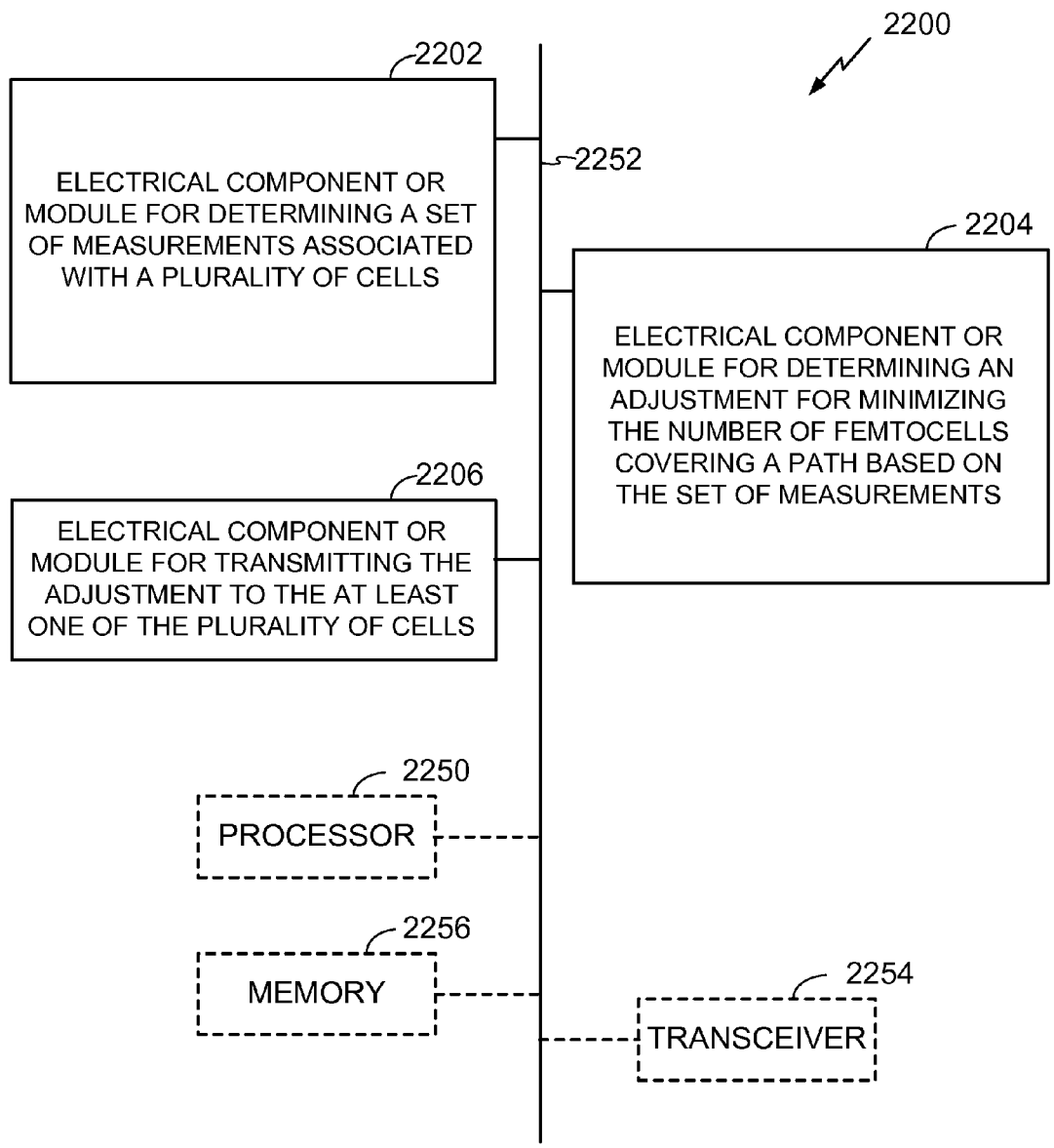
FIG. 22 shows an embodiment of an apparatus for mitigating femtocell pilot pollution by minimizing a number of femtocells covering a path, in accordance with the methodology of FIG. 21.

FIG. 22 shows an embodiment of an apparatus for mitigating pilot pollution, in accordance with the methodology of FIG. 20. With reference to FIG. 22, there is provided an exemplary apparatus 2200 that may be configured as a network entity (e.g., a femocell, a macrocell, a picocell, or the like) in a wireless network, or as a processor or similar device/component for use within the network entity. The apparatus 2200 may include functional blocks that can represent functions implemented by a processor, software, or combination thereof (e.g., firmware). For example, apparatus 2200 may include an electrical component or module 2202 for determining a set of measurements associated with a plurality of cells. The apparatus 2200 may include an electrical component or module 2204 for determining an adjustment for minimizing the number of femtocells covering a path based on the set of measurements. The apparatus 2200 may include an electrical component or module 2206 for transmitting the adjustment to the at least one of the plurality of cells.

In related aspects, the apparatus 2200 may optionally include a processor component 2250 having at least one processor, in the case of the apparatus 2200 configured as a network entity (e.g., a femocell, a macrocell, a picocell, or the like), rather than as a processor. The processor 2250, in such case, may be in operative communication with the components 2202-2206 via a bus 2252 or similar communication coupling. The processor 2250 may effect initiation and scheduling of the processes or functions performed by electrical components 2202-2206.

In further related aspects, the apparatus 2200 may include a radio transceiver component 2254. A stand alone receiver and/or stand alone transmitter may be used in lieu of or in conjunction with the transceiver 2254. When the apparatus 2200 is a network entity, the apparatus 2200 may also include a network interface (not shown) for connecting to one or more core network entities. The apparatus 2200 may optionally include a component for storing information, such as, for example, a memory device/component 2256. The computer readable medium or the memory component 2256 may be operatively coupled to the other components of the apparatus 2200 via the bus 2252 or the like. The memory component 2256 may be adapted to store computer readable instructions and data for effecting the processes and behavior of the components 2202-2206, and subcomponents thereof, or the processor 2250, or the methods disclosed herein. The memory component 2256 may retain instructions for executing functions associated with the components 2202-2206. While shown as being external to the memory 2256, it is to be understood that the components 2202-2206 can exist within the memory 2256. It is further noted that the components in FIG. 22 may comprise processors, electronic devices, hardware devices, electronic sub-components, logical circuits, memories, software codes, firmware codes, etc., or any combination thereof.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the disclosure herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the disclosure herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the disclosure herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In one or more exemplary designs, the functions described may be implemented in hardware, software, firmware, or any combination thereof. If implemented in software, the functions may be stored on or transmitted over as one or more instructions or code on a computer-readable medium. Non-transitory computer-readable media includes both computer storage media including any medium that facilitates transfer of a computer program from one place to another. A storage media may be any available media that can be accessed by a general purpose or special purpose computer. By way of example, and not limitation, such computer-readable media may comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Disk and disc, as used herein, includes compact disc (CD), laser disc, optical disc, digital versatile disc (DVD), floppy disk and Blu-ray disc where disks usually hold magnetically encoded data, while discs hold optically encoded data. Combinations of the above should also be included within the scope of computer-readable media.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein but is to be accorded the widest scope consistent with the principles and novel features disclosed herein.

What is claimed is:

1. A method comprising:
   determining, by at least one apparatus, a set of wireless signal measurements for a plurality of small cells;
   detecting, by the at least one apparatus, pilot cell pollution within a coverage area of the plurality of small cells based on the measurements;
   determining, by the at least one apparatus, an adjustment of at least one transmission parameter of at least one of the plurality of small cells for reducing the pilot cell pollution, wherein the determining the adjustment comprises determining signal to interference and noise ratios (SINRs) in the coverage area for the plurality of small cells based on the set of measurements and identifying at least one value for the at least one transmission parameter that maximizes a sum of the SINRs; and
   transmitting, by the at least one apparatus, the adjustment to the at least one of the plurality of small cells.

2. The method of claim 1, wherein the determining the adjustment comprises minimizing an area of overlap between at least two small cells having signal power difference below a threshold based on the set of measurements.

3. The method of claim 1, wherein the determining the adjustment comprises distributing traffic load to at least two of the small cells based on the set of measurements.

4. The method of claim 1, wherein the determining the adjustment comprises minimizing the number of small cells covering a path comprising a plurality of physical locations, and the minimizing is based on the set of measurements.

5. The method of claim 4, wherein the method is run at regular intervals, and the determining the adjustment is updated based on the regular intervals.

6. The method of claim 4, wherein the path comprises a road way.

7. The method of claim 1, wherein the determining the adjustment is performed by a network entity including a femtocell.

8. The method of claim 1, wherein the determining the adjustment is based on at least one of a numerical procedure or iterative procedure.

9. The method of claim 1, wherein the determining the adjustment further comprises determining based on at least one of a signal quality constraint or transmit power level constraint.

10. The method of claim 1, wherein the determining the adjustment comprises determining a resource comprising power, frequency, or time.

11. The method of claim 1, wherein the determining the set of measurements comprises at least one of: (i) determining measurements of the plurality of small cells at a femtocell, (ii) receiving measurement report messages from a mobile station, (iii) determining measurements from idle user registration, (iv) determining measurements from active user handover, or (v) determining measurements from handover history information.

12. The method of claim 1, wherein the set of measurements comprise radio frequency information including path loss information or received signal strength information.

13. The method of claim 1, wherein the determining the adjustment comprises:
   determining signal levels of pilot signals from the small cells based on the set of measurements;
   identifying at least two of the pilot signals for which a difference between the signal levels of the at least two pilot signals is less than a threshold amount; and
   identifying at least one value for the at least one transmission parameter that minimizes an overlapping coverage area associated with the at least two pilot signals.

14. A wireless communication apparatus comprising:
   at least one processor configured for determining a set of wireless signal measurements for a plurality of small cells, detecting pilot cell pollution within a coverage area of the plurality of small cells based on the measurements, determining an adjustment of at least one transmission parameter of at least one of the plurality of small cells for reducing the pilot cell pollution, wherein the determining the adjustment comprises determining signal to interference and noise ratios (SINRs) in the coverage area for the plurality of small cells based on the set of measurements and identifying at least one value for the at least one transmission parameter that maximizes a sum of the SINRs, and transmitting the adjustment to the at least one of the plurality of small cells; and
   a memory coupled to the at least one processor for storing data.

15. The apparatus of claim 14, wherein the at least one processor is further configured for determining the adjustment at least in part by minimizing an area of overlap between at least two small cells having signal power difference below a threshold based on the set of measurements.

16. The apparatus of claim 14, wherein the at least one processor is further configured for determining the adjustment at least in part by distributing traffic load to at least two of the small cells based on the set of measurements.

17. The apparatus of claim 14, wherein the at least one processor is further configured for determining the adjustment at least in part by minimizing the number of small cells covering a path comprising a plurality of physical locations, and the minimizing is based on the set of measurements.

18. The apparatus of claim 14, wherein the at least one processor is further configured for periodically performing the determining the adjustment.

19. The apparatus of claim 14, wherein the at least one processor is further configured for determining the adjustment based on at least one of a numerical procedure or iterative procedure.

20. The apparatus of claim 14, wherein the at least one processor is further configured for determining the adjustment based on at least one of a signal quality constraint or transmit power level constraint.

21. The apparatus of claim 14, wherein the at least one processor is further configured for determining the adjustment at least in part by determining a resource comprising power, frequency, or time.

22. The apparatus of claim 14, wherein the at least one processor is further configured for determining the set of measurements at least in part by at least one of: (i) determining measurements of the plurality of small cells at a femtocell, (ii) receiving measurement report messages from a mobile station, (iii) determining measurements from idle user registration, (iv) determining measurements from active user handover, or (v) determining measurements from handover history information.

23. The apparatus of claim 14, wherein the at least one processor is further configured for determining the set of measurements comprising radio frequency information including path loss information or received signal strength information.

24. The apparatus of claim 14, wherein the at least one processor is further configured for determining the adjustment at least in part by:
   determining signal levels of pilot signals from the small cells based on the set of measurements;
   identifying at least two of the pilot signals for which a difference between the signal levels of the at least two pilot signals is less than a threshold amount; and
   identifying at least one value for the at least one transmission parameter that minimizes an overlapping coverage area associated with the at least two pilot signals.

25. A wireless communication apparatus comprising:
   means for determining a set of wireless signal measurements for a plurality of small cells;
   means for detecting pilot cell pollution within a coverage area of the plurality of small cells based on the measurements;
   means for determining an adjustment of at least one transmission parameter of at least one of the plurality of small cells for reducing the pilot cell pollution, wherein the determining the adjustment comprises determining signal to interference and noise ratios (SINRs) in the coverage area for the plurality of small cells based on the set of measurements and identifying at least one value for the at least one transmission parameter that maximizes a sum of the SINRs; and
   means for transmitting the adjustment to the at least one of the plurality of small cells.

26. A non-transitory computer-readable medium comprising code for causing at least one computer to:
   determine a set of wireless signal measurements for a plurality of small cells;
   identify pilot cell pollution within a coverage area of the plurality of small cells based on the measurements;
   determine an adjustment of at least one transmission parameter of at least one of the plurality of small cells for reducing the pilot cell pollution, wherein the determination of the adjustment comprises determining signal to interference and noise ratios (SINRs) in the coverage area for the plurality of small cells based on the set of measurements and identifying at least one value for the at least one transmission parameter that maximizes a sum of the SINRs; and
   transmit the adjustment to the at least one of the plurality of small cells.

* * * * *